United States Patent
Hernanz

(10) Patent No.: US 8,375,132 B2
(45) Date of Patent: Feb. 12, 2013

(54) SCHEDULABLE TRANSPORT FOR CONTRIBUTION SERVICES

(75) Inventor: Carlos Hernanz, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 277 days.

(21) Appl. No.: 12/714,726

(22) Filed: Mar. 1, 2010

(65) Prior Publication Data

US 2011/0213887 A1 Sep. 1, 2011

(51) Int. Cl.
G06F 15/16 (2006.01)

(52) U.S. Cl. ......... 709/227; 709/203; 709/204; 709/230

(58) Field of Classification Search .................. 709/204, 709/205, 217, 227, 203, 230; 370/260, 261
See application file for complete search history.

(56) References Cited

U.S. PATENT DOCUMENTS

| | | | |
|---|---|---|---|
| 6,839,416 B1 | 1/2005 | Shaffer | |
| 7,266,091 B2 * | 9/2007 | Singh et al. | 370/260 |
| 7,949,117 B2 * | 5/2011 | Jeong et al. | 370/261 |
| 7,953,867 B1 * | 5/2011 | Andreasen | 709/227 |
| 2005/0076304 A1 * | 4/2005 | Shing | 715/716 |
| 2007/0038701 A1 * | 2/2007 | Majors et al. | 709/204 |
| 2007/0040890 A1 * | 2/2007 | Morioka et al. | 348/14.01 |
| 2007/0124381 A1 * | 5/2007 | Zurko | 709/205 |
| 2008/0189425 A1 * | 8/2008 | Green | 709/227 |
| 2009/0005038 A1 * | 1/2009 | Yasrebi et al. | 455/435.1 |
| 2009/0319916 A1 * | 12/2009 | Gudipaty et al. | 715/753 |
| 2009/0320082 A1 * | 12/2009 | Collazo | 725/105 |
| 2010/0238994 A1 * | 9/2010 | Cakareski et al. | 375/240.01 |

* cited by examiner

*Primary Examiner* — Ramy M Osman
(74) *Attorney, Agent, or Firm* — Edell, Shapiro & Finnan, LLC

(57) ABSTRACT

In one embodiment a method includes receiving a request to schedule an audiovisual data streaming session, the request including an identifier of an encoder, a session time and an identifier of an invitee, generating a command configured to cause the encoder to begin encoding audiovisual content at the session time, and to stream encoded audiovisual content via the network, receiving an indication that the invitee has joined the audiovisual data streaming session, and generating a command configured to cause an audiovisual decoder designated by the invitee to begin decoding the encoded audiovisual content upon receipt of the encoded audiovisual content.

18 Claims, 23 Drawing Sheets

SCHEDULABLE TRANSPORT FOR CONTRIBUTION SERVICES

TECHNICAL FIELD

The present disclosure relates to scheduling and enabling selected encoders and decoders for streaming of broadcast media contribution services over Internet Protocol (IP) networks.

BACKGROUND

Broadcasters, such as television broadcasters or other content providers, capture audiovisual content and then pass that content to, e.g., a production studio for distribution to end users. This process, prior to distribution, is known as "contribution." To enable contribution, an audio/video link between, e.g., a sports venue or concert hall and a broadcaster's studio, is established. Contribution in the digital era involves transporting digitalized audiovisual content (either live or "canned") between live event sites (such as stadiums, concerts, etc.) on the one hand and studios or production sites on the other hand.

Audiovisual contribution in broadcasting environments can be scheduled. For example, the date and time of a sports event may be well known in advance. On the other hand, contribution may also be required on demand for a specific amount of time, e.g., in the case of news contribution. In neither scenario, however, is there a need for "24×7" network connectivity. Nevertheless, there are high expectations for network quality and availability when a contribution service is desired.

DESCRIPTION OF EXAMPLE EMBODIMENTS

Overview

Figure 1A:
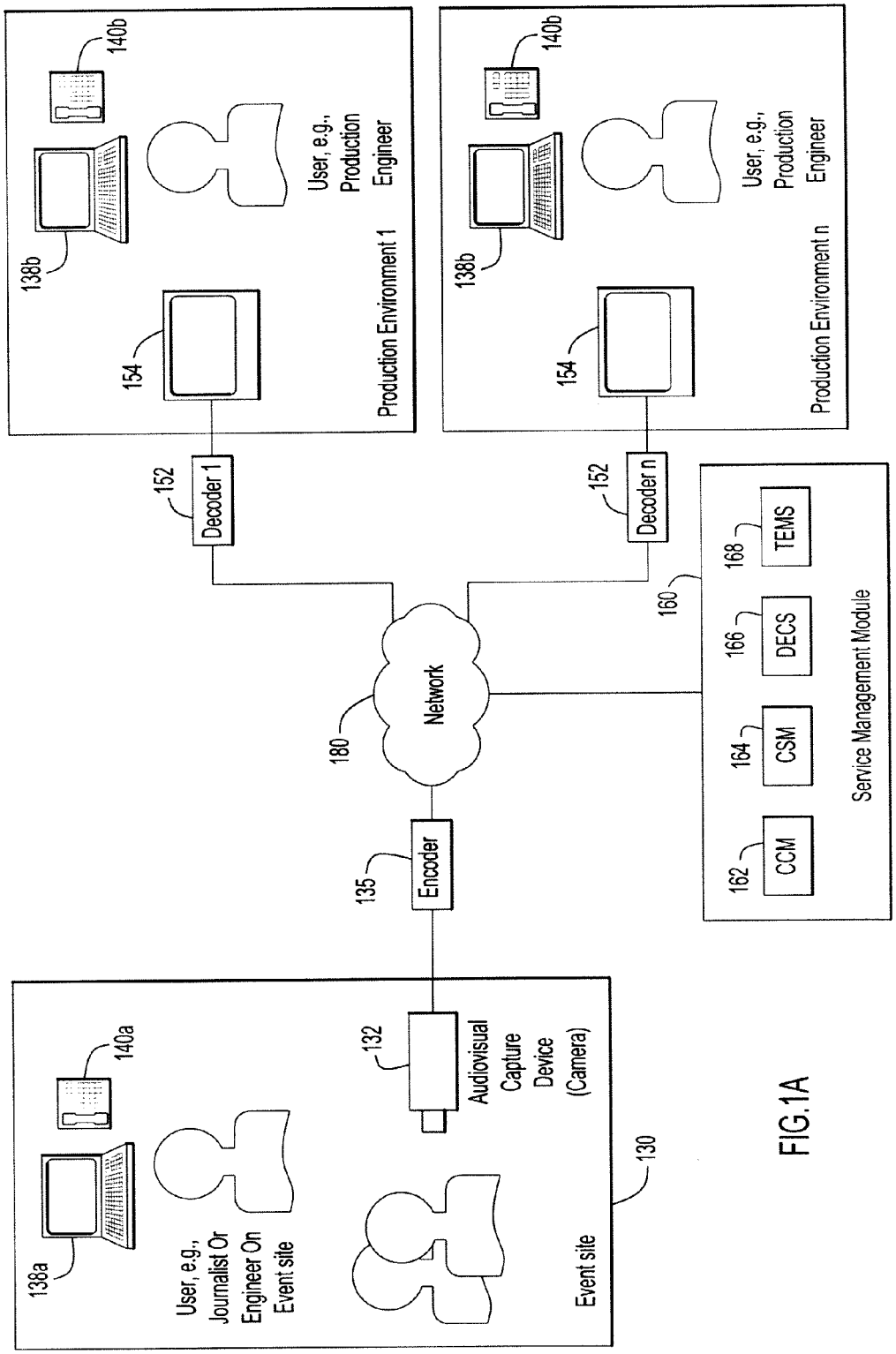
FIG. 1A shows an example contribution system in accordance with an embodiment.

In one embodiment a method includes receiving a request to schedule an audiovisual data streaming session, the request including an identifier of an encoder, a session time and an identifier of an invitee, generating a command configured to cause the encoder to begin encoding audiovisual content at the session time, and to stream encoded audiovisual content via the network, receiving an indication that the invitee has joined the audiovisual data streaming session, and generating a command configured to cause an audiovisual decoder designated by the invitee to begin decoding the encoded audiovisual content upon receipt of the encoded audiovisual content.

In another embodiment, an Internet Protocol (IP) telephone is configured to present an invitation to participate in an audiovisual session and, in connection therewith, receive an identifier for a selected audiovisual decoder from among a plurality of available audiovisual decoders for decoding encoded audiovisual content associated with the audiovisual session.

Example Embodiments

While current contribution transport technologies are legacy transport technologies, such as Synchronous Optical Network/Synchronous Digital Hierarchy (SONET/SDH) or asynchronous transfer mode (ATM), IP-based transport solutions are increasingly being used, in part because of the wide availability of Ethernet interfaces in video adaptation devices (including encoders, decoders, video gateways, etc.), the cost efficiencies that are implicit in the use of IP technology, higher bandwidth requirements derived from the need to evolve towards HD (High Definition) video at lower cost than legacy technology, and the need for convergence of services to a common communications infrastructure, among others.

Described herein is a broadcast media-over-IP contribution solution that provides dial-up and scheduling functionality for contribution services, so that service providers and broadcasters can make better use of the expensive and scarce bandwidth resources in a context of growing use of IP networks. However, those skilled in the art will appreciate that the systems and methodologies described herein should not be interpreted as being limited to traditional "contribution" services. Rather, the described embodiments can be employed with respect to any suitable audiovisual service in which encoders and decoders may be selected. Embodiments described herein may employ IP telephony devices or a personal computer (PC) to provision a multipoint contribution transmission in real time, to "dial in" from a remote end in order to join a video/audio contribution transmission, or to schedule a multipoint contribution transmission service by using an agenda/calendar application from a user's PC.

In this way, the provision of a desired contribution service can be requested and performed by any user of the system. For example, a broadcast production engineer, a journalist, a sports events reporter, a news correspondent, etc. can use the system (i.e., schedule and cause to supply a contribution service) by using friendly dial-up devices or familiar scheduling and calendaring tools. Further, the system may rely on the use of private addressing or public numbering plans. In the latter case, the system and methodology described herein may be used for public, inter-broadcaster or wholesale dial-up contribution services.

In the following, the term "device" is used herein to describe any endpoint component of the system that the user can directly or indirectly interact with. This can include, but is not limited to, PCs, IP phones, Encoders and Decoders.

The term "interface" is used herein to describe any mechanism on the endpoint device that allows network connectivity; this can include, but is not limited to, Ethernet ports, VPN (virtual private network) tunnels, pseudowire instances, and VLANs (virtual Local Area Network) instances, among others.

The term "user interface" is used herein to describe any mechanism on the endpoint device or an application client that allows the user to interact with it. This can include, but is not limited to, PC or IP phone keyboard, buttons and screen, including tactile screen, calendar or scheduling application client dialog or configuration screens, among others, and combinations thereof.

FIG. 1A shows an IP Multi Protocol Label Switching (MPLS) contribution system in accordance with an embodiment. At event site 130 there is provided an audiovisual capture device (e.g., a camera) 132 that captures video and audio. Of course, those skilled in the art will appreciate that there may be multiple cameras 132, where only one is shown for the sake of simplicity. Camera 132 is in communication with encoder 135 (or video adapter or video gateway), whose main function is to encapsulate video/audio content into IP packets. Event site 130 also includes a personal computer (PC) 138a and and/or IP telephone 140a whose functionalities will be described in more detail below.

Encoder 135 is connected to network 180, which in this non-limiting example is an IP MPLS networking infrastructure that provides transport for unicast and multicast traffic. The general case could be based on IP multicast (for example, Source Specific Multicast (SSM) based, or may be IP MPLS TE (traffic engineering) tunneling, either point-to-point, or point-to-multipoint tunnels, provisioned by a Traffic Engineering Management System (TEMS) 168 described later herein.

It is noted that multicast provides a general solution both for point to point contributions as well as point to multipoint, since the multipoint case is the general scenario of contribution towards n number or receivers, whereas the point to point case is a particular scenario where the number of receiving ends (n) is one. Source Specific Multicast (SSM) is an extension of IP Multicast in which traffic is forwarded to receivers from only those multicast sources for which the receivers have explicitly expressed interest. As such, it provides significant benefits in terms of bandwidth savings.

MPLS Traffic Engineering in a broadcast media contribution system in accordance with an embodiment has the following attributes. It delivers the service characteristics of circuit-switched networks, over packet-based networks, such as explicit routing of packets through a pre-defined physical topology, bandwidth reservation along the path as a consequence of using RSVP (resource reservation protocol) as the signaling protocol of tunnels, fast bandwidth restoration (in addition to connectivity restoration) under failure circumstances like link failures, among other benefits. It further provides a desirable baseline solution for better use of under or over utilized backbones, from an efficient network resource utilization perspective. It also facilitates the provision of strict SLAs (service level agreements) to end customers and provides predictable network performance along the path, matching of traffic flows to QoS (quality of service) resources, and delivery of hard bandwidth guarantees.

Referring still to FIG. 1, also in communication with network 180 is a production environment 150 (thus defining the overall contribution service from event site to a production site). At or in communication with the production environment 150 there is a decoder 152 and, in this example, also a monitor 154 via which a production engineer or other user might monitor the audio visual content. Those skilled in the art will appreciate that a number n of decoders 152 (video adapters or video gateways), whose main function is to de-encapsulate video/audio content from IP encapsulation, may also be provided, as depicted.

The production environment 150 is some type of studio, where the content is received and processed. For the sake of simplicity, it is assumed that the receiving end is a video/audio monitor or n video/audio monitors for the general case of a multipoint contribution to n sites. However, the production environment 150 could also, more simply, be an end user of the content.

In order to transform current IP contribution deployments into a dial up-enabled system (namely, to incorporate, e.g., IP telephone functionality into the system), in addition to the components described above, there is also provided, in one embodiment, a Service Management Module 160 that provides system level control. Service Management Module 160 may be implemented as one or more hardware components, one or more software components, or combinations thereof.

Figure 1B:
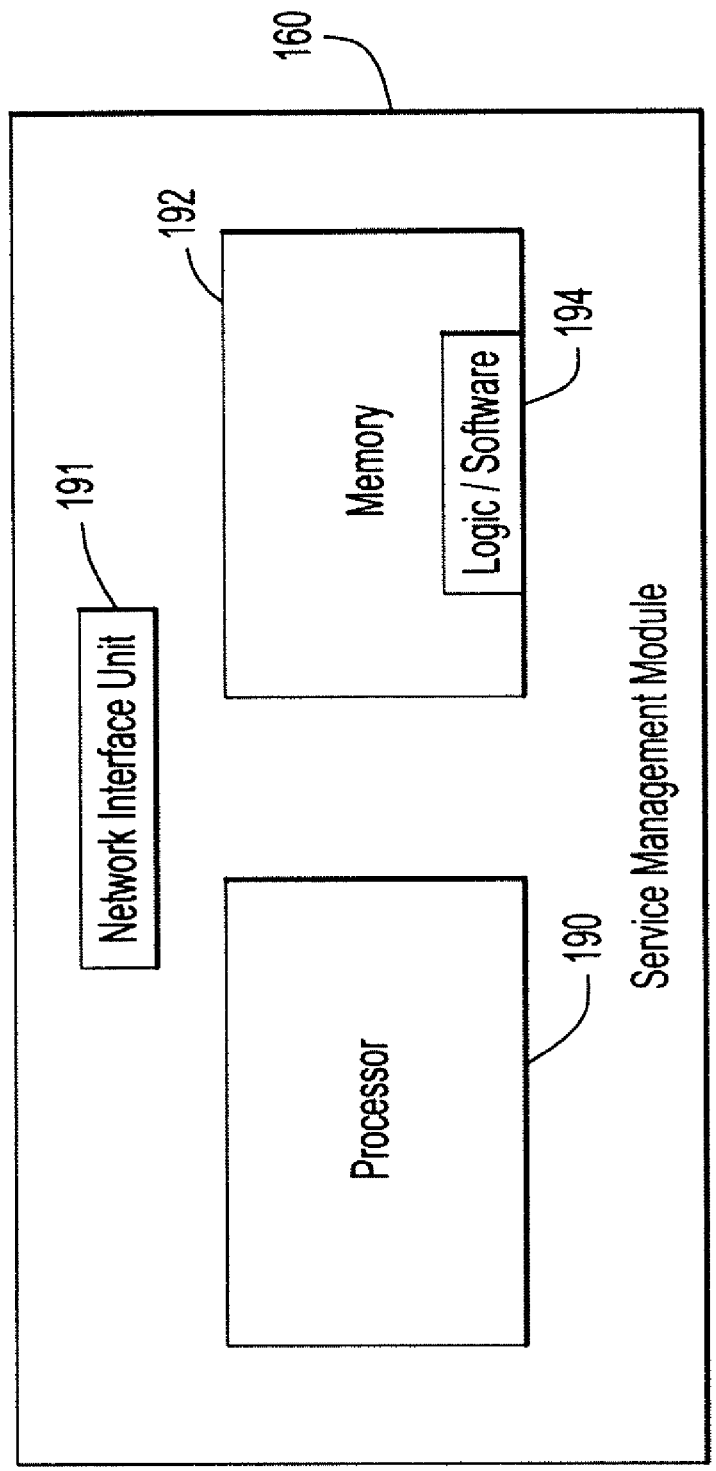
FIG. 1B shows an example implementation of a Service Management Module in accordance with an embodiment.

In one possible embodiment, as shown in FIG. 1B, Service Management Module 160 (or any of its individual components) is comprised of a programmable processor (microprocessor or microcontroller) or a fixed-logic processor 190. In the case of a programmable processor, any associated memory 192 may be of any type of tangible processor readable memory (e.g., random access, read-only, etc.) that is encoded with or stores instructions. Alternatively, Service Management Module 160 may be comprised of a fixed-logic processing device, such as an application specific integrated circuit or digital signal processor that is configured with firmware comprised of instructions or logic 194 that cause the processor to perform the functions described herein. Thus, Service Management Module 160 may take any of a variety of forms, so as to be encoded in one or more tangible media for execution, such as with fixed logic or programmable logic (e.g., software/computer instructions executed by a processor) and any processor may be a programmable processor, programmable digital logic (e.g., field programmable gate array) or an application specific integrated circuit (ASIC) that comprises fixed digital logic, or a combination thereof. In general, any process logic may be embodied in a processor readable medium that is encoded with instructions for execution by a processor that, when executed by the processor, are operable to cause the processor to perform the functions described herein. To enable connectivity with network 180, a network interface unit 191 may also be provided.

With reference again to FIG. 1A, Service Management Module 160, in an example embodiment, comprises the following elements or components: Call Control Manager (CCM) 162, Contribution Service Manager (CSM) 164, Directory, Email and Calendar Server (DECS) 166 and Traffic Engineering Management System (TEMS) 168, each of which is described in more detail below, and also in conjunction with FIGS. 2A-2U as appropriate. Notably, each of the foregoing components may be implemented separately from Service Management Module 160 and may further be implemented in hardware, software or combinations thereof similarly to the implementation possibilities of Service Management Module 160 just described.

CCM 162 may be part of an existing corporate unified communications system, whose function is the control of calls originated from any IP dialing endpoint (e.g., IP Phone 140a, 140b) that belongs to the corporate unified communications deployment of the broadcaster.

CSM 164 provides functional, application level connectivity between IP contribution system elements (encoders/decoders 135, 152, network 180, etc.), CCM 162 of the corporate unified communications system, DECS 166 and TEMS 168. In an embodiment, CSM 164 provides device registration, device availability management, calendaring integration and scheduling management, service activation and enablement of, where available, one-button-to-push access to scheduled contributions, and integration of contribution services with CCM 162, including triggering of IVR (Interactive Voice Response) messages to signal specific conditions to a user's IP phone in the form of a voice message. In addition, CSM 164 interworks with TEMS 168 to ensure that traffic engineering tunnels provisioned, by CSM 164, for a specific provisioned contribution session, have the necessary bandwidth available along the paths, or, where there is insufficient bandwidth available, to provide an indication to the user that the system does not have enough network resources, via, for example, a resources unavailability signal or busy indication in the calendaring application used to schedule contribution services (described more fully in connection with FIGS. 2A-2U).

TEMS 168, in an example embodiment, operates to provision traffic engineering tunnels over the IP MPLS networking infrastructure 180, maintain an inventory of network elements, maintain a topology database, keep track of established and booked tunnels, and keep track of and control the use of bandwidth resources in the IP MPLS network 180, in order to be able to decide what end-to-end path with available bandwidth a contribution service will use, and eventually, to signal incidences back towards CSM 164 in case a scheduled contribution service cannot be scheduled and guaranteed end to end for bandwidth availability reasons.

DECS 166 contains the corporate calendaring system that provides a corporate calendar application that, in an embodiment, is used for scheduling of audio/video contribution services. Also, DECS 166 may be used by CSM 164 as the database for device registration and availability management purposes.

As noted, IP phone endpoints, namely IP phones 140*a*, 140*b* may be the same phones that are used for corporate unified communications, and are used for IP telephony purposes. In accordance with an embodiment, IP phones 140*a*, 140*b*, have advanced capabilities, including the ability to have commands, data, functionality and programming downloaded to enable custom functionality. Such downloads may come in the form of XML, enabling the IP phone to interoperate with system elements via the IP protocol, upon receipt of a command via a user interface. In accordance with an embodiment, IP phones are programmed to enable services scheduling, directory browsing, messaging, etc. Such functionality is enhanced through the use of advanced user-interface capabilities including a tactile screen.

PCs 138*a*, 138*b* may also be employed by leveraging the capabilities of corporate email and calendar.

As mentioned, CSM 164 maintains a database of devices and system components using, e.g., DECS 166. Of course, that functionality could be implemented directly within CSM 164. In an example embodiment, there are individual entries for each origin encoder 135, each IP phone 140*a*, 140*b*, and each decoder 152 in a database operated by DECS 166. These entries may be entered manually in the database, once, at the time that a new device is installed. The components of a directory entry for the different devices in the system may thus include:

IP Phones: an IP phone can be identified by these unique parameters:
  Identification name of the device (ID name); this can correspond to the name or username of the user of this device,
  A unicast IP address (optionally, a unicast IP address can be assigned by a dynamic IP assignment system such as DHCP (Dynamic Host Configuration Protocol); in such a case, DECS 166 would request an IP address from, e.g., a DHCP server),
  A registration key or password, used to authenticate and validate the device, and
  A phone number that is assigned after the phone is authenticated and validated into the system.

Encoders: an encoder is identified by the following unique parameters:
  Identification name of the device (ID name),
  An IP unicast address, for management purposes (loopback interface),
  An IP unicast address of an output Ethernet interface that identifies the Source IP address for decoders to join a specific multicast source and group (S, G) pair,
  An IP multicast address that corresponds to the audiovisual stream to be transported that will be used by remote decoders to join the multicast group (G),
  A next hop IP address, namely the Ethernet interface of the router in the network to which the encoder is directly interfacing with, and
  A registration key or password, used to authenticate and validate the device.

Decoders: a decoder is identified in the system by the following unique parameters:
  An identification name of the device (ID name),
  A management IP unicast address (loopback interface),
  An IP unicast address of the input Ethernet interface that interfaces with the network,
  A next hop address, namely the Ethernet interface of the router in the network to which the decoder is directly interfacing with, and
  A registration key or password, used to authenticate and validate the device.

In an embodiment, CSM 164 keeps track of the status of devices at any given time. As such, the device entries in the directory may also contain the following status flags:
  Device not logged in,
  Device logged in, authenticated and validated, and
  Device currently in use.

Encoders 135 and decoders 152 are bookable resources for users at the time of scheduling a service or when a user is accepting an invitation to join a scheduled contribution service and is prompted to select a specific decoder for this purpose. CSM 164 keeps a record of booked encoders and decoders that includes, for example:
  Origin device (Encoder ID name),
  Date, time, and duration of time for which the encoder have been booked,
  List of remote end devices (receiving decoders' ID names) that accepted an invitation for the specific contribution service; this record is employed by CSM 164 to command TEMS 168 to book a traffic engineering tunnel for the specific contribution service, and
  Type of encoding and bandwidth required by the encoder for the transmission of the contribution service into the network.

The directory may also maintain a register of the system users (email addresses, contact details), since this directory may also be the one used by the corporate email application. User email addresses are used in the process for several purposes, including when CSM 164 initiates scheduling confirmations and reminders to participants of a specific contribution service, among others.

Figure 2A:
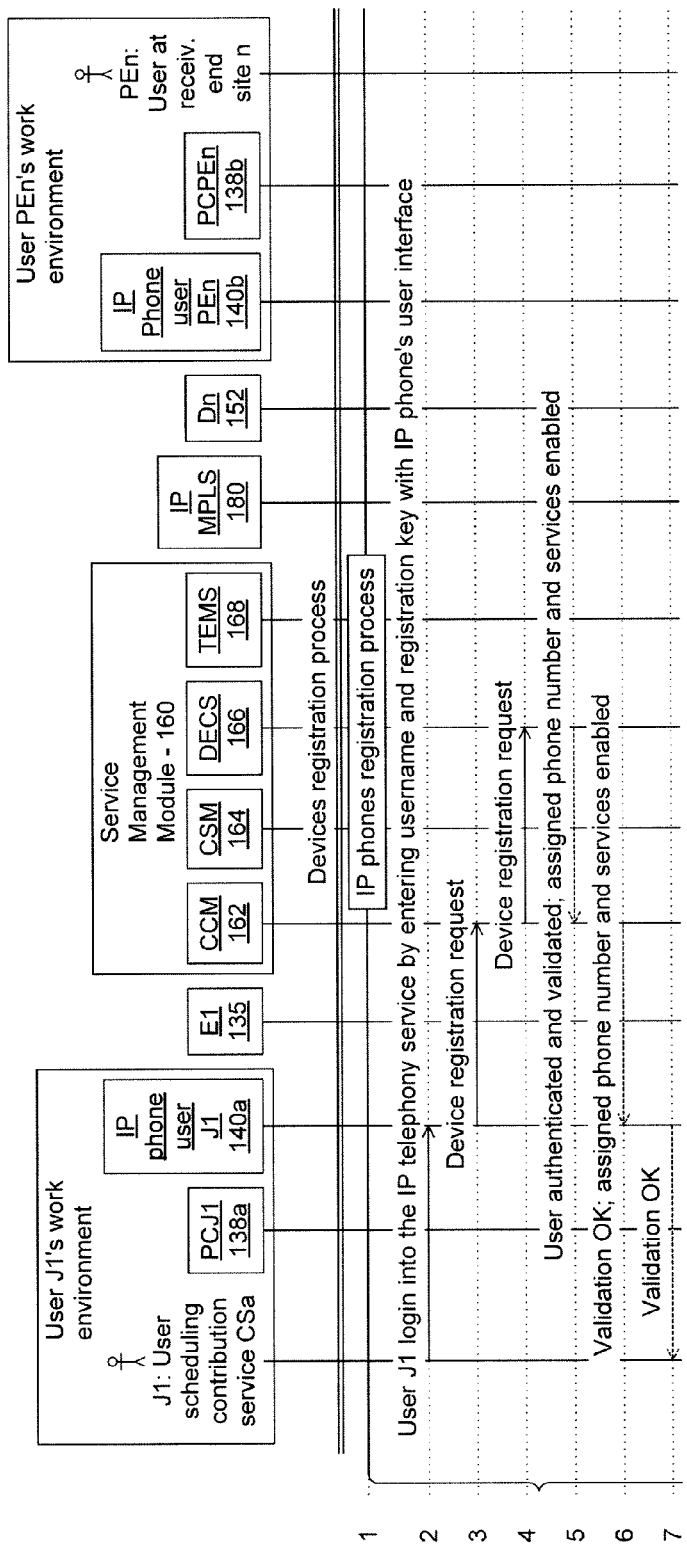
FIGS. 2A-2U show an example sequence of steps in accordance with an embodiment.
Figure 2B:
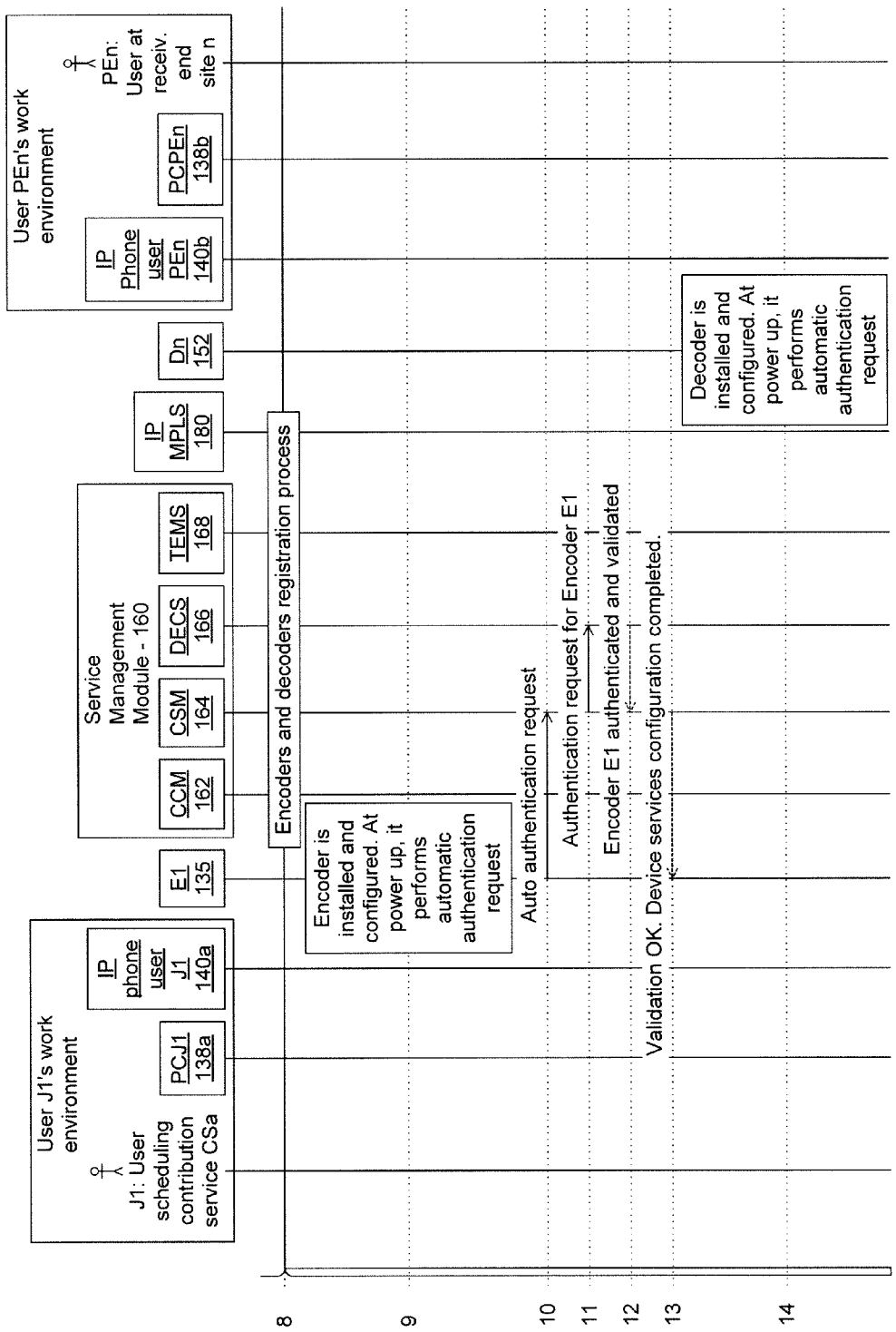
Figure 2C:
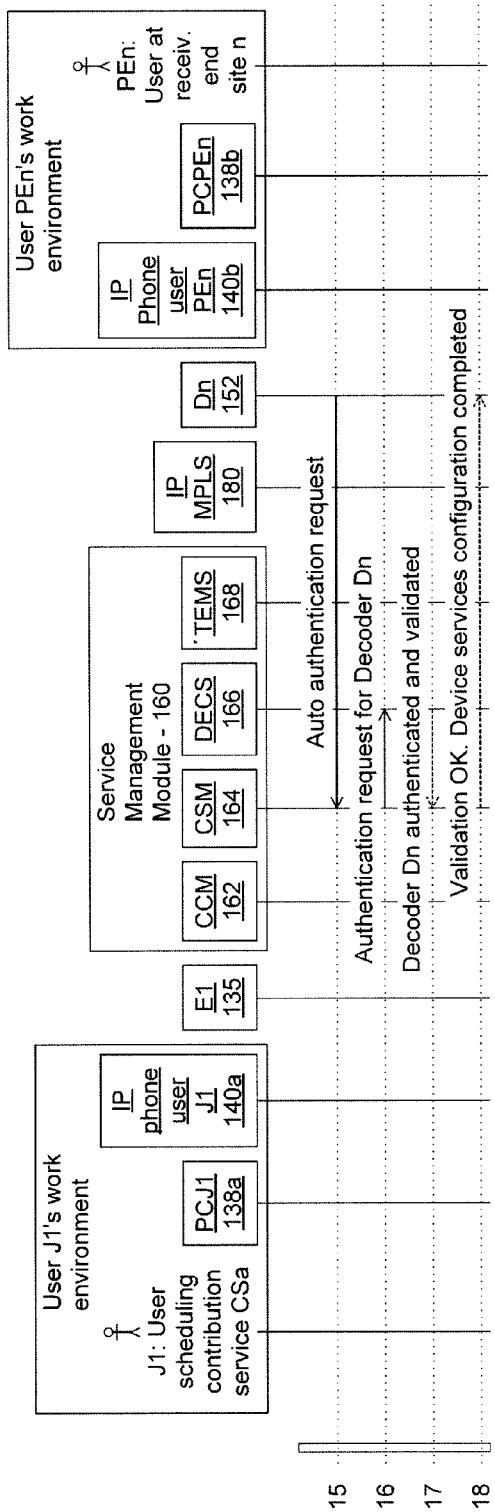
Figure 2D:
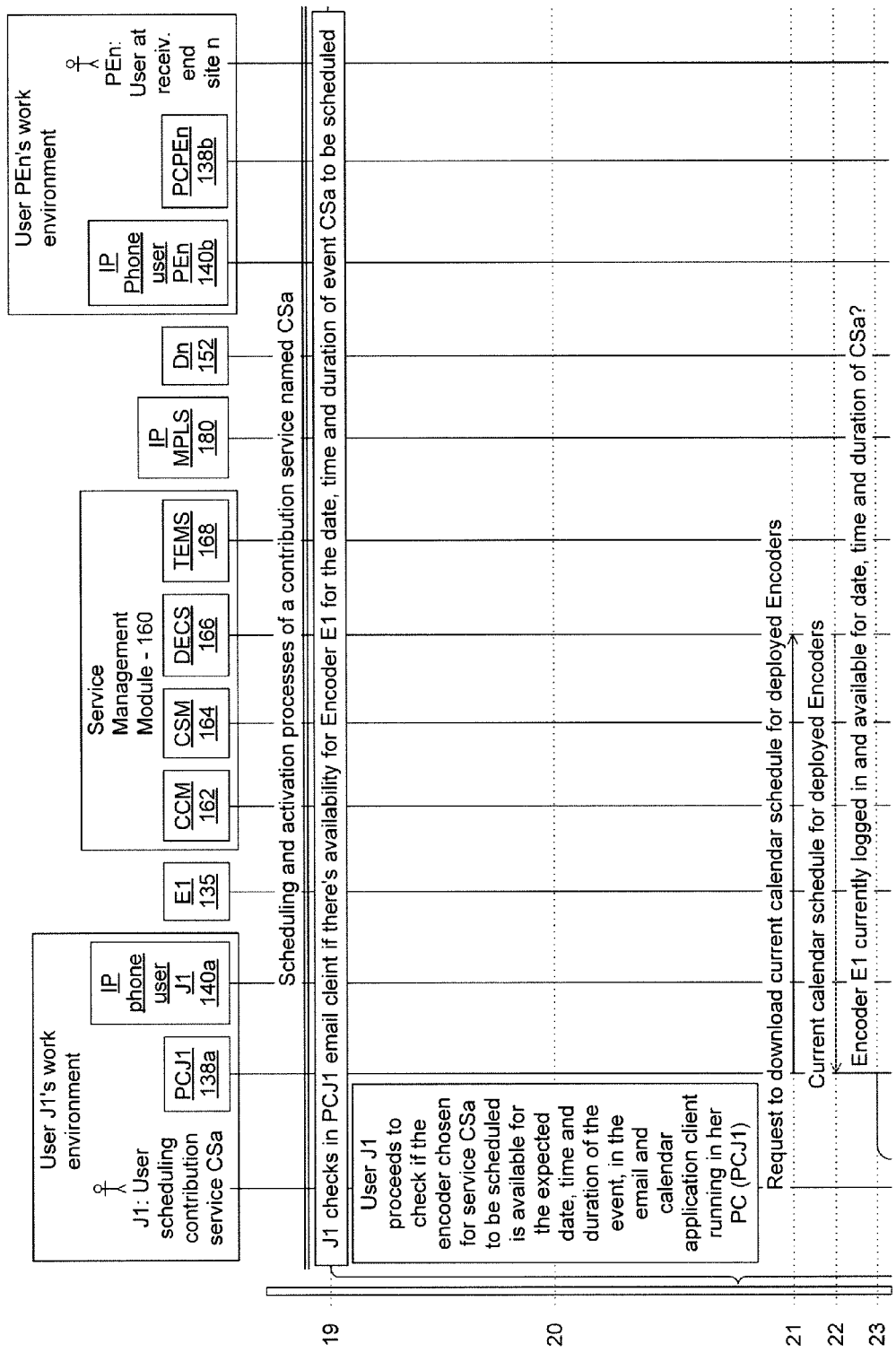
Figure 2E:
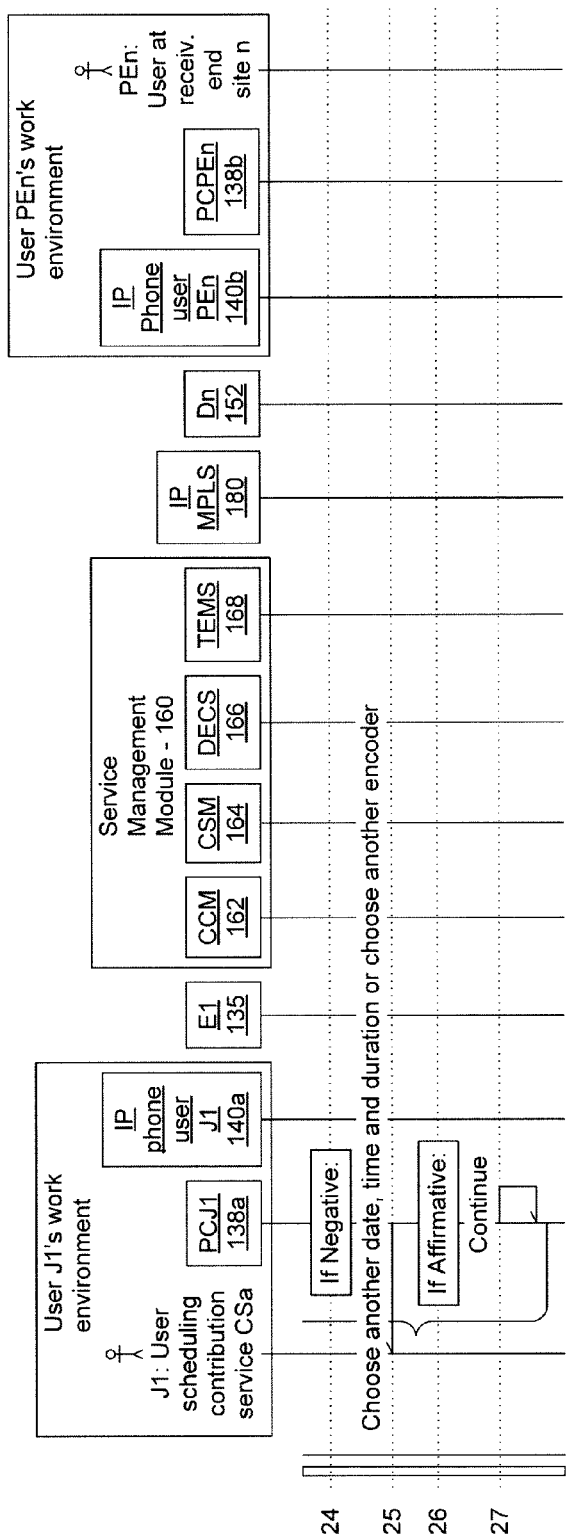
Figure 2F:
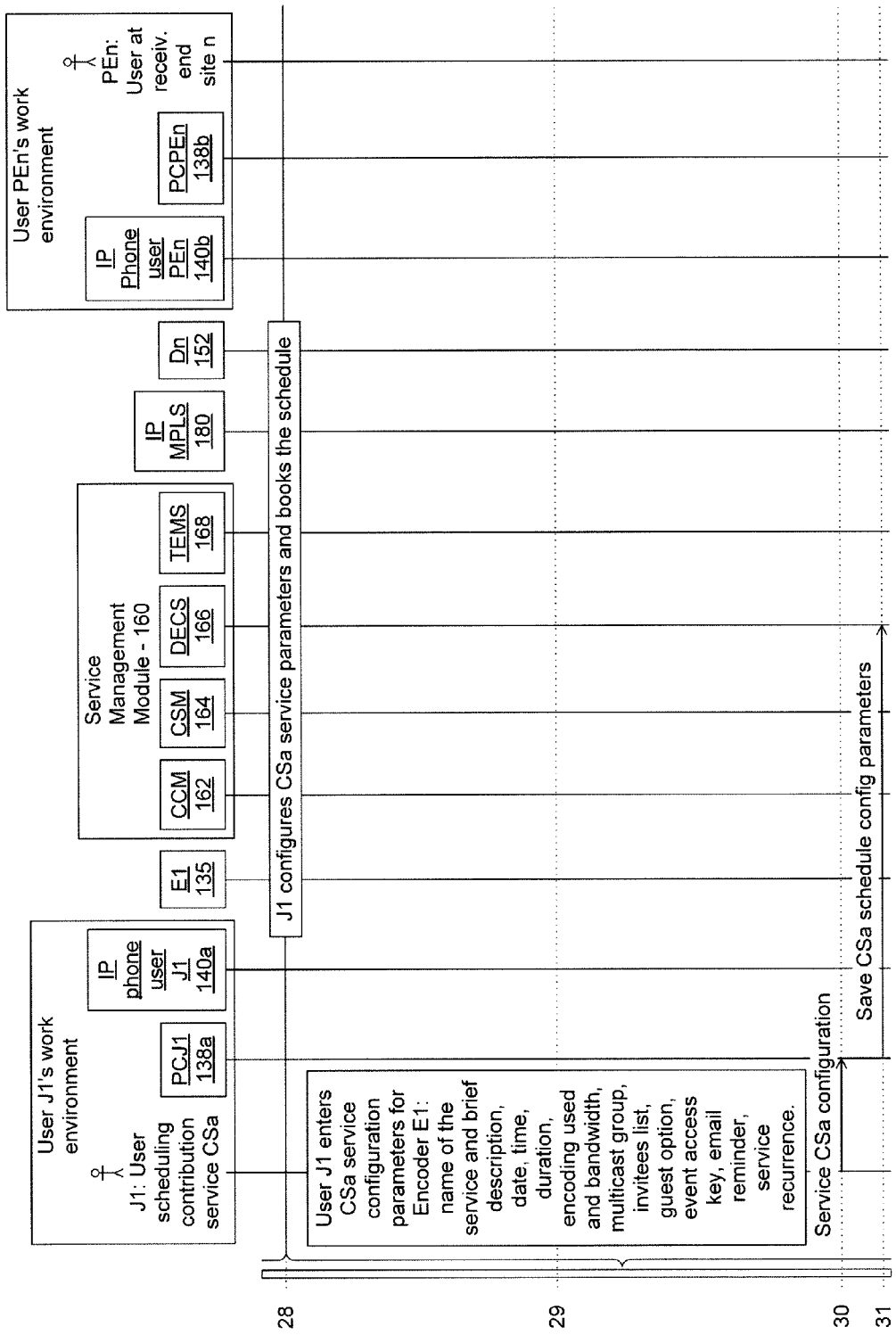
Figure 2G:
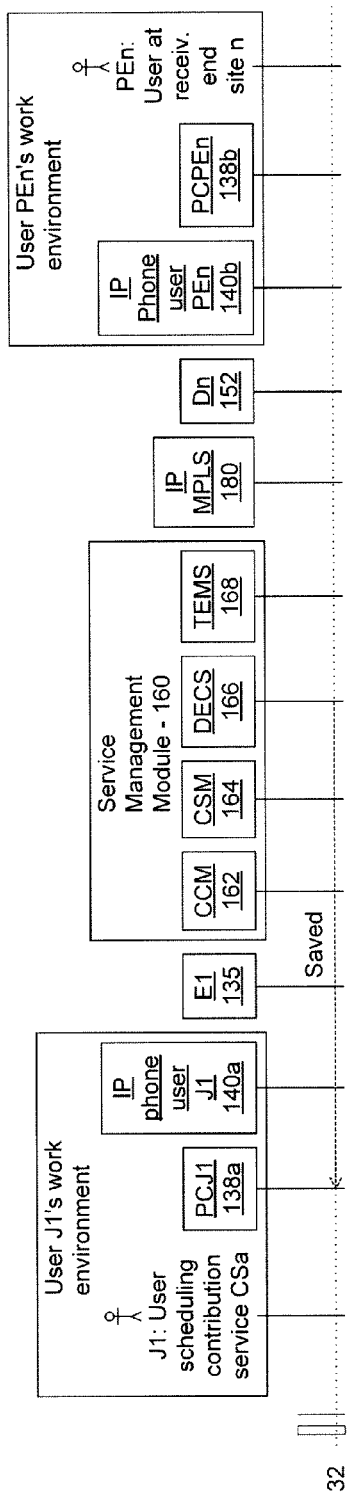
Figure 2H:
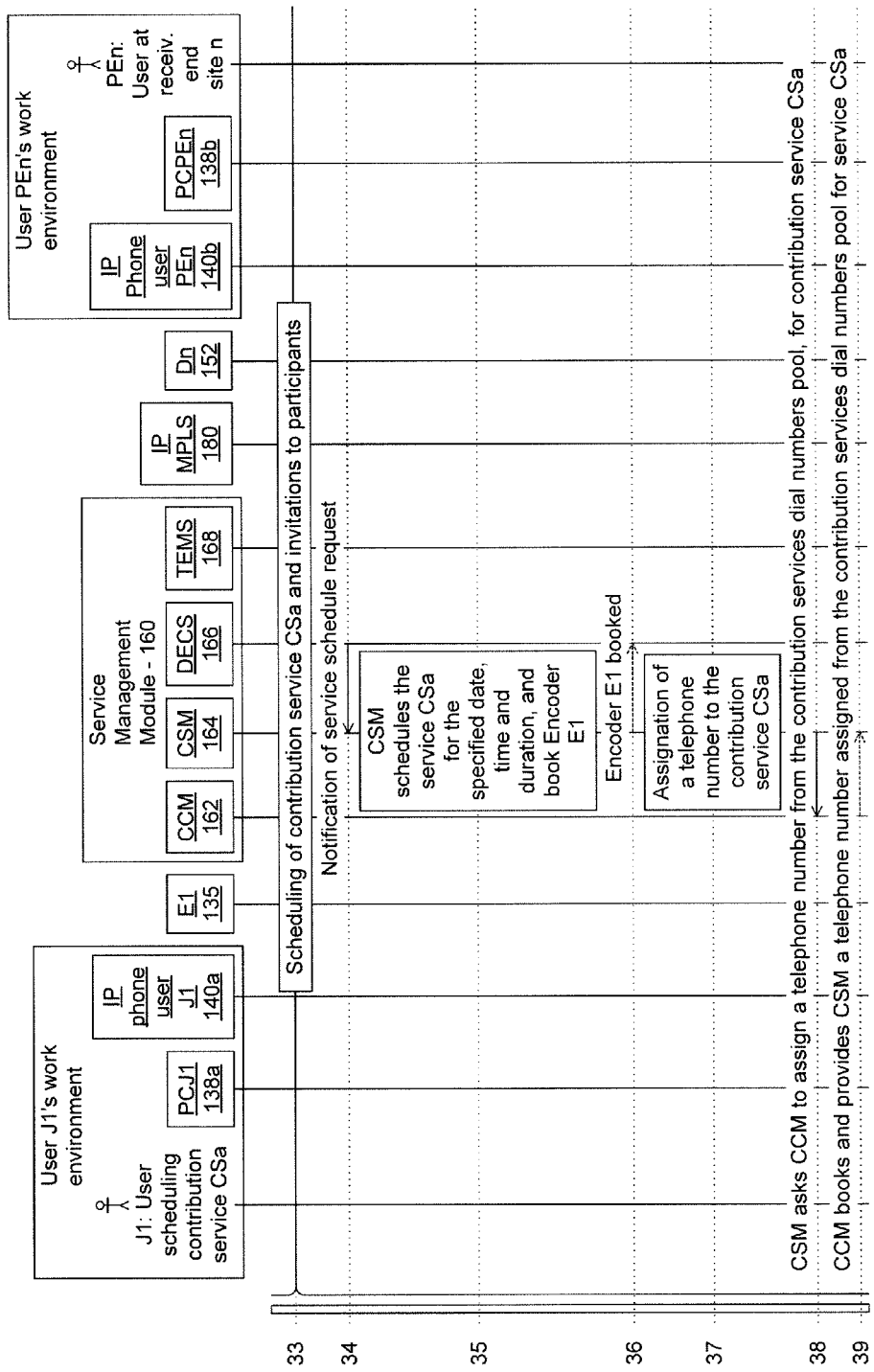
Figure 2I:
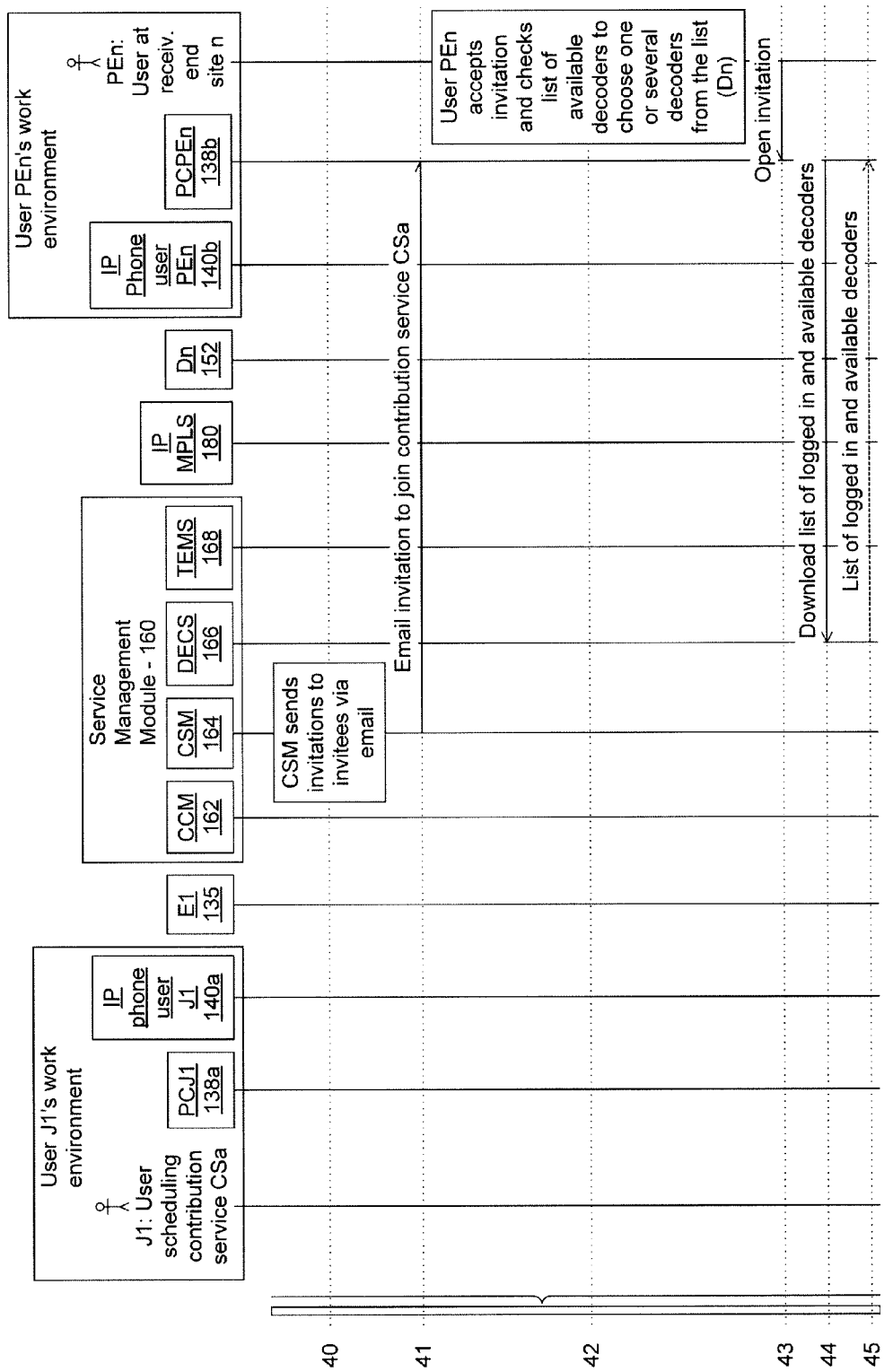
Figure 2J:
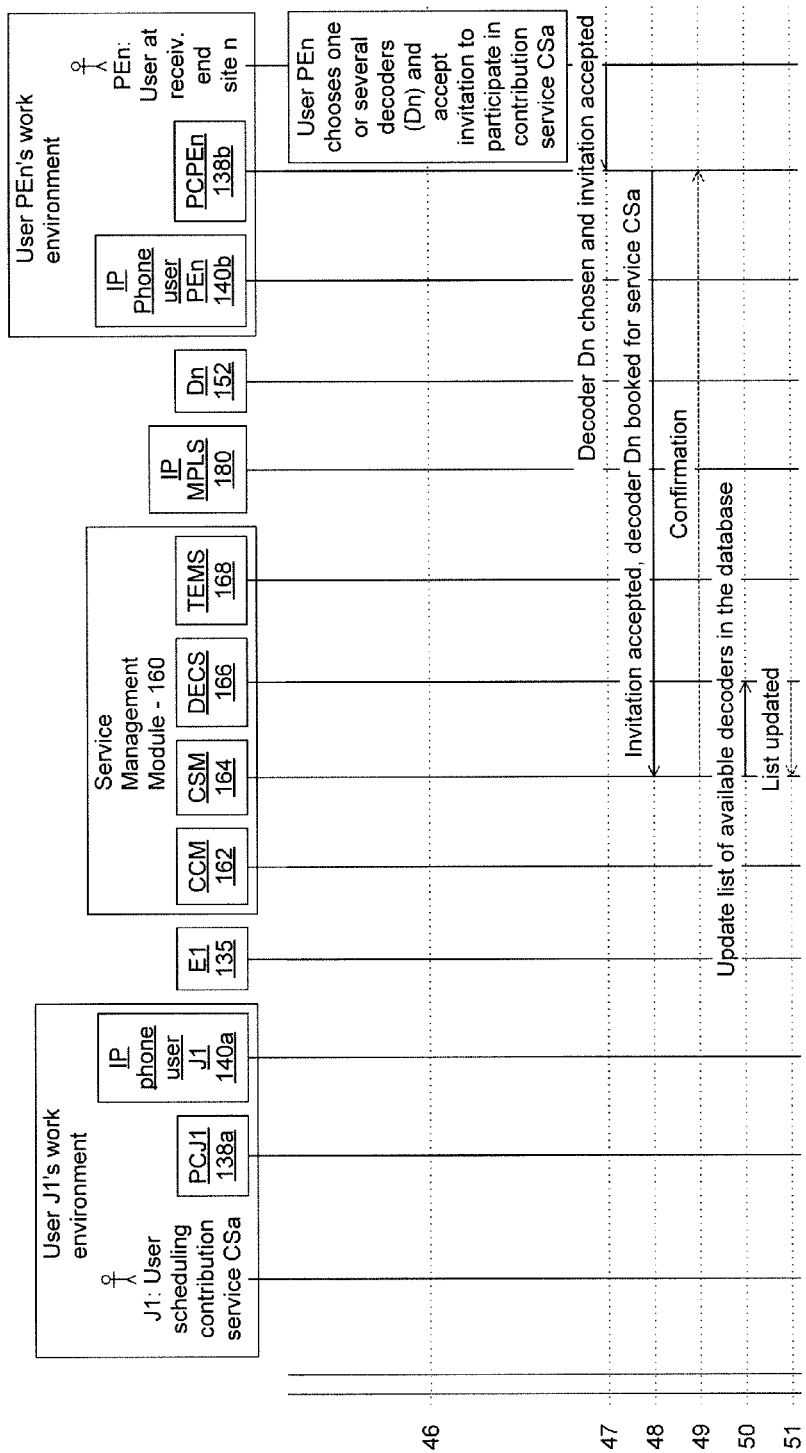
Figure 2K:
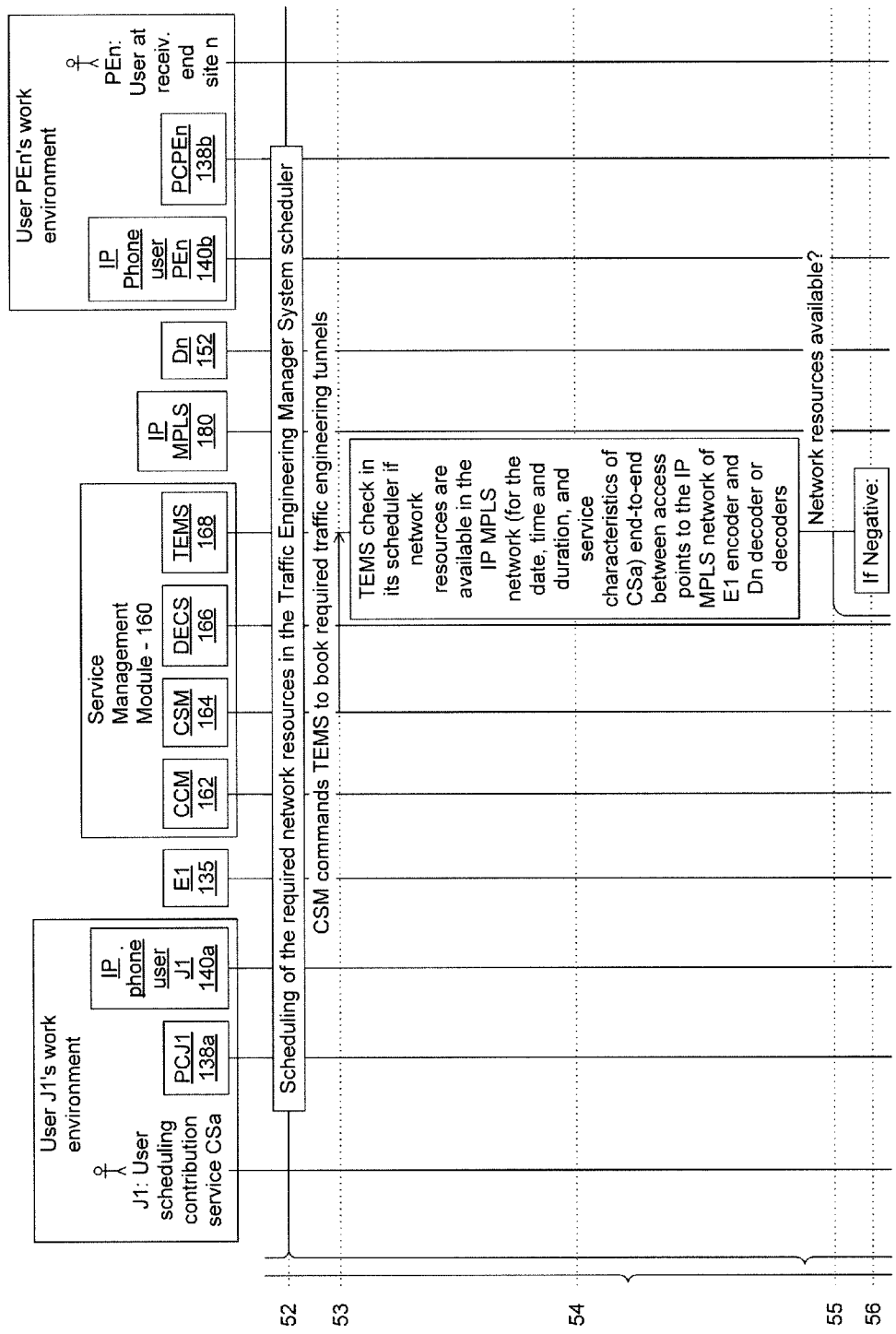
Figure 2L:
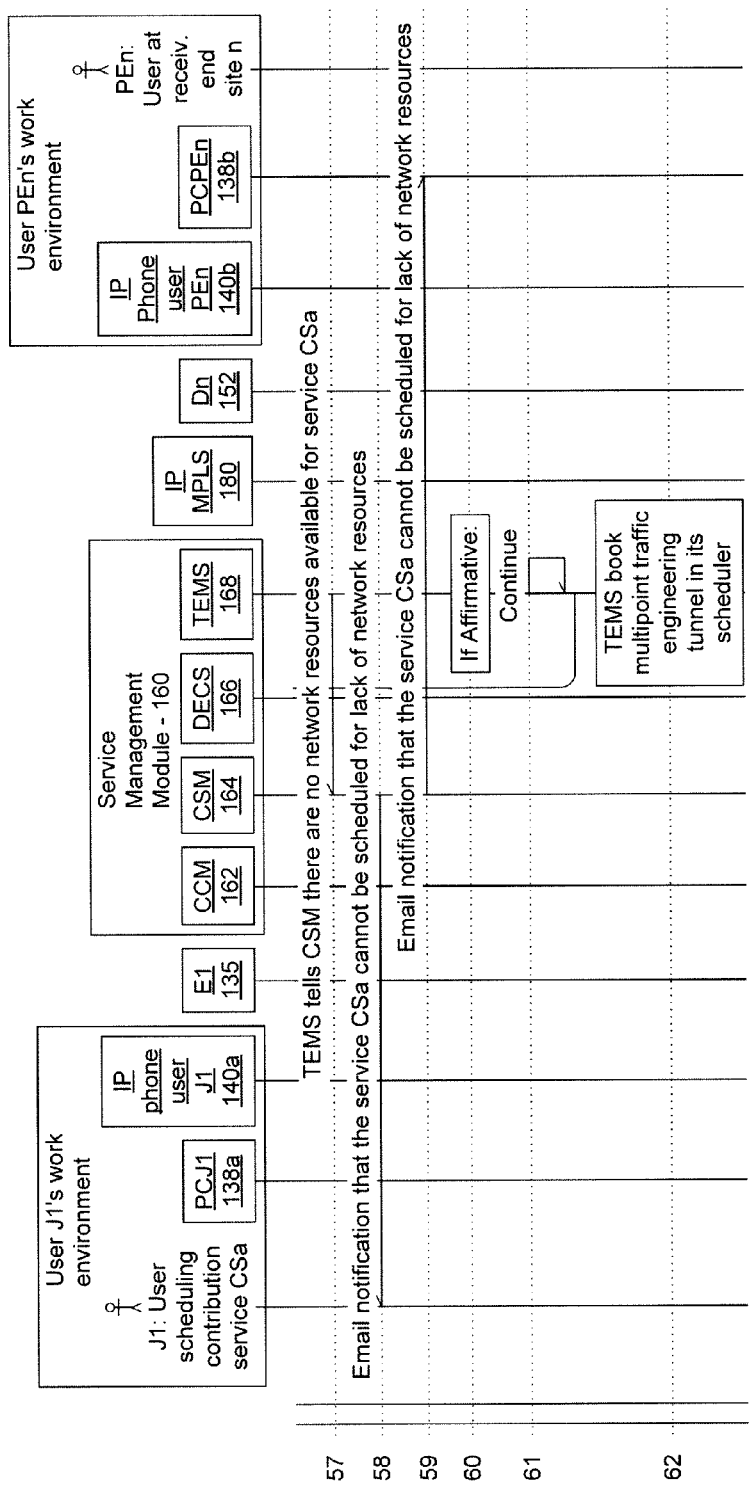
Figure 2M:
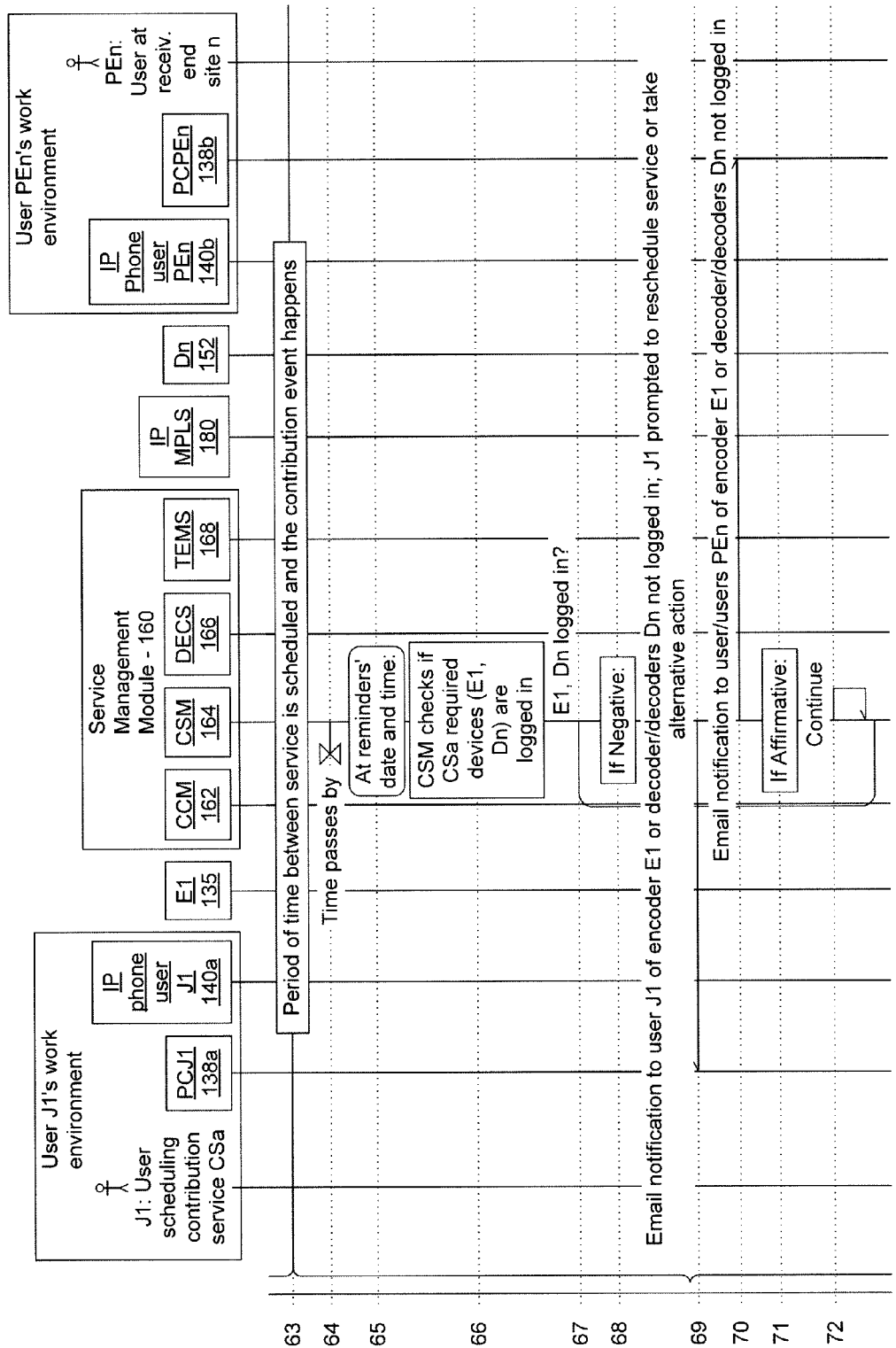
Figure 2N:
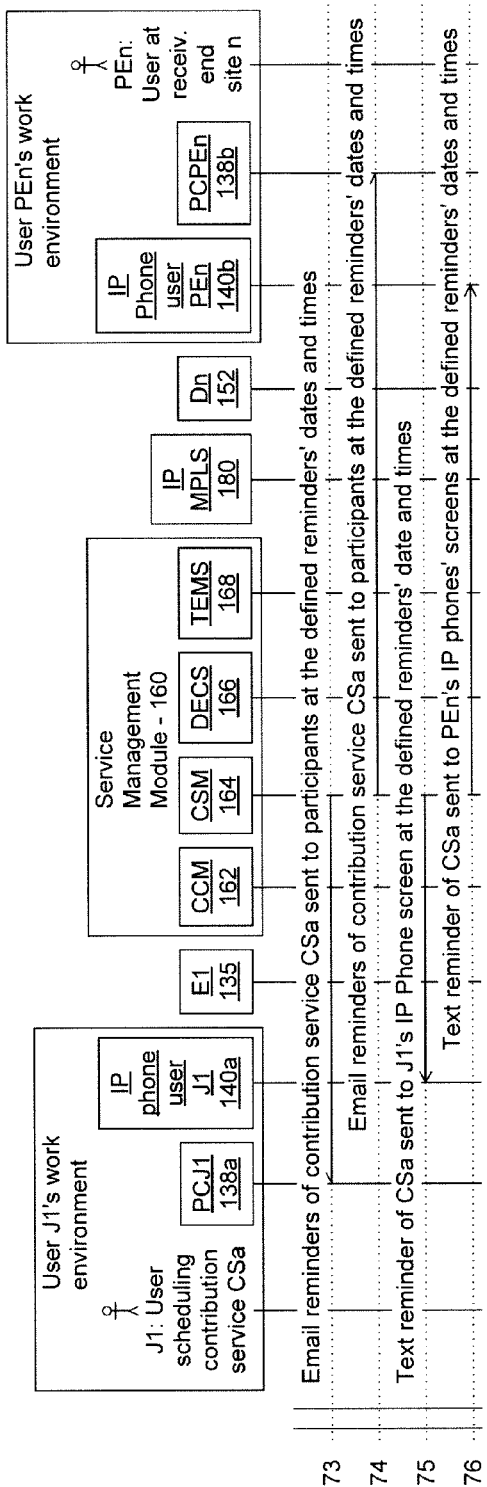
Figure 2O:
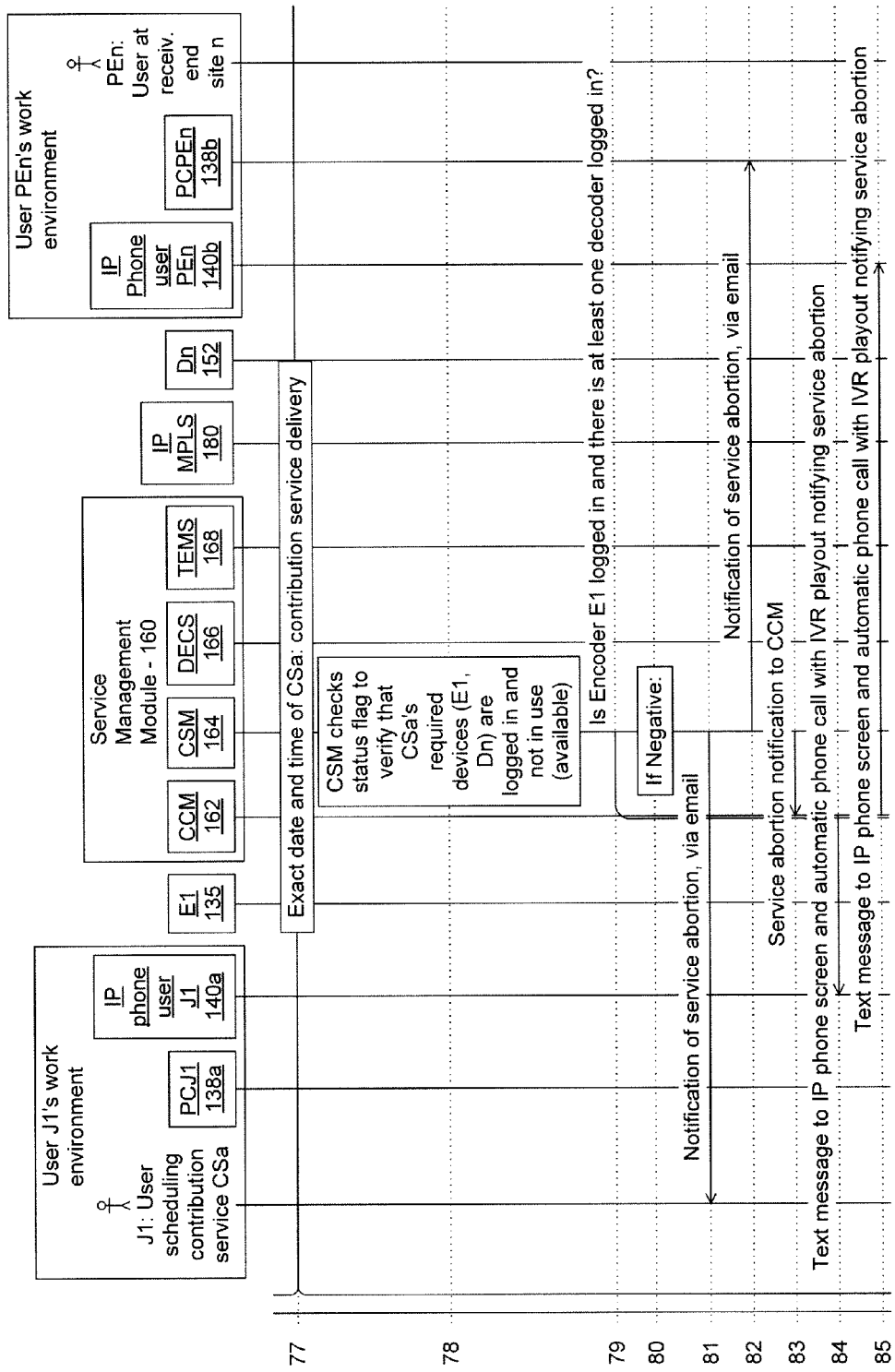
Figure 2P:
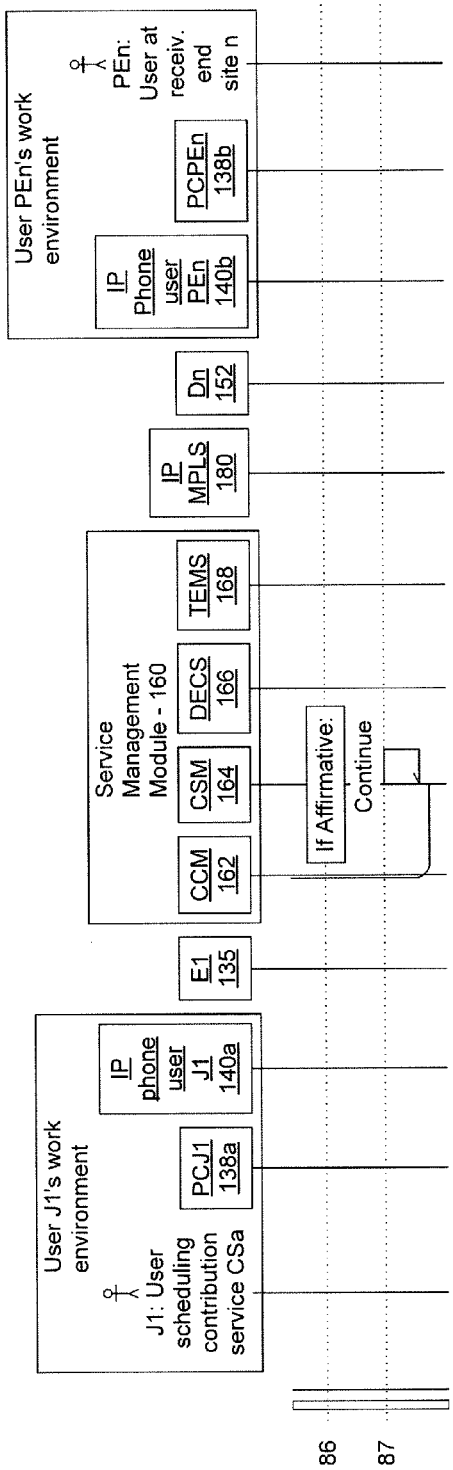
Figure 2Q:
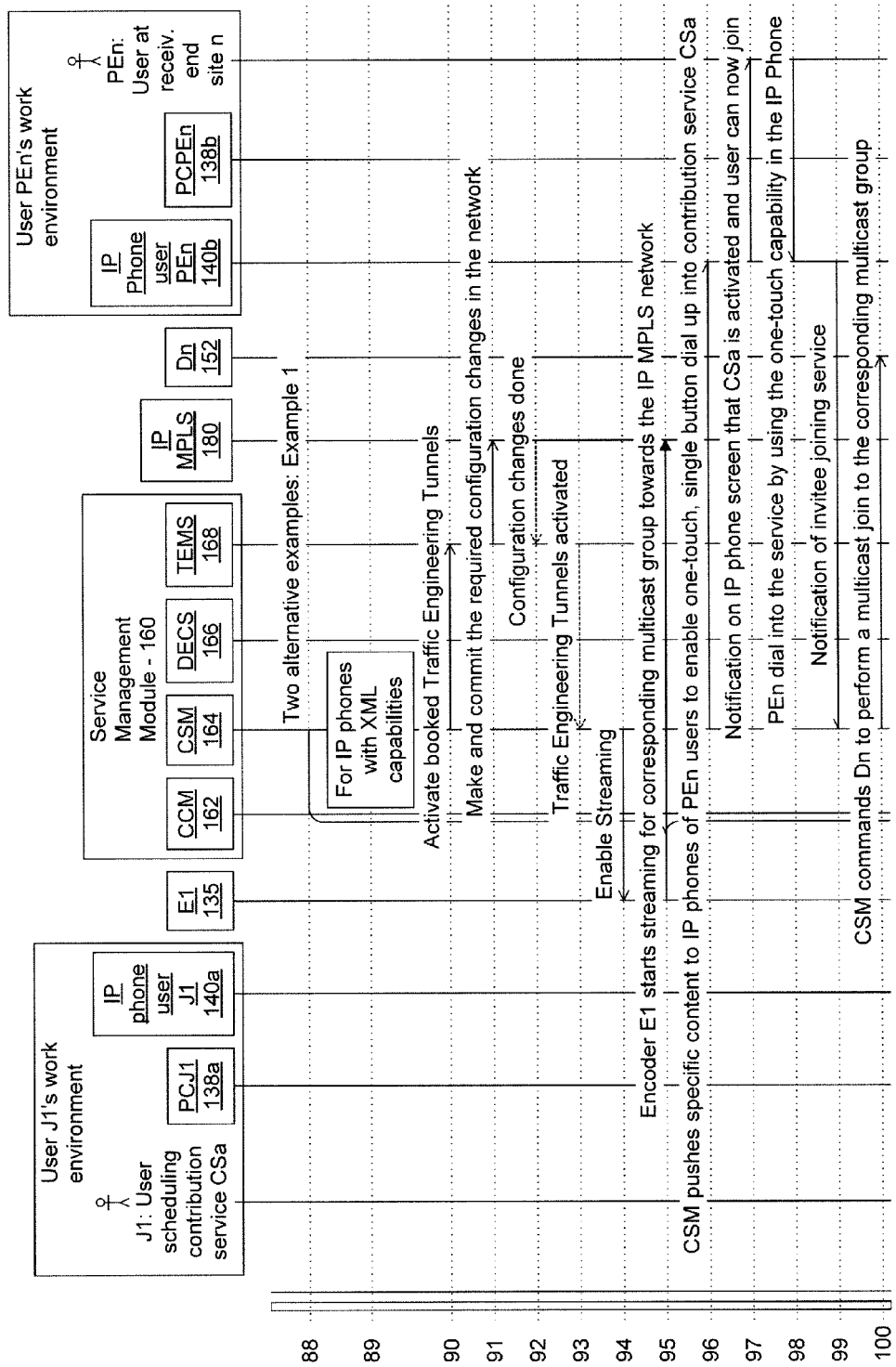
Figure 2R:
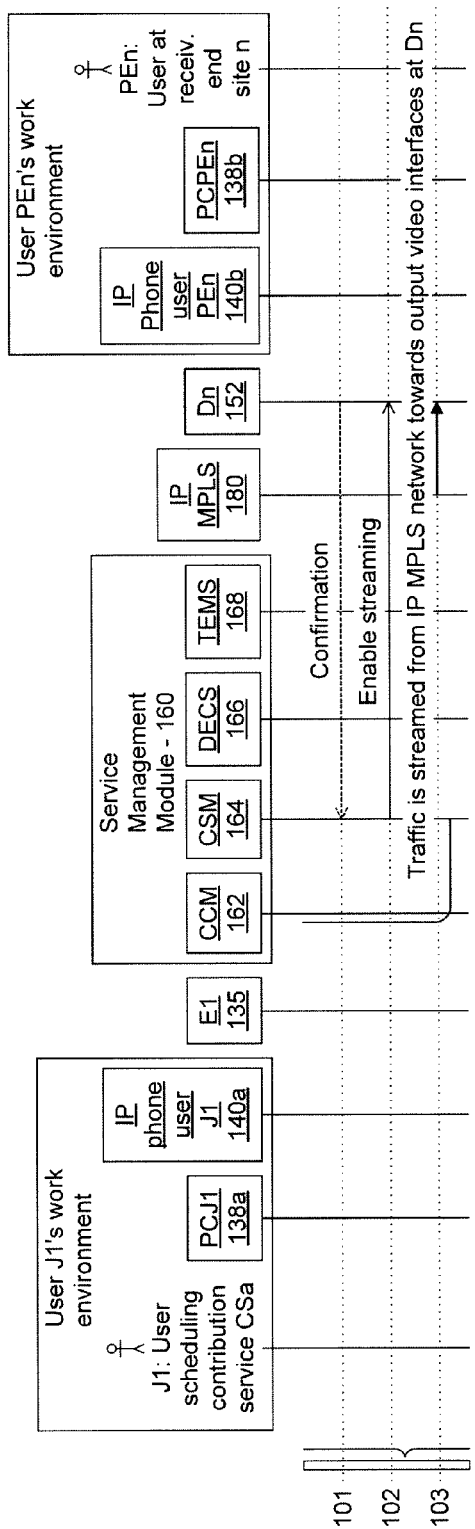
Figure 2S:
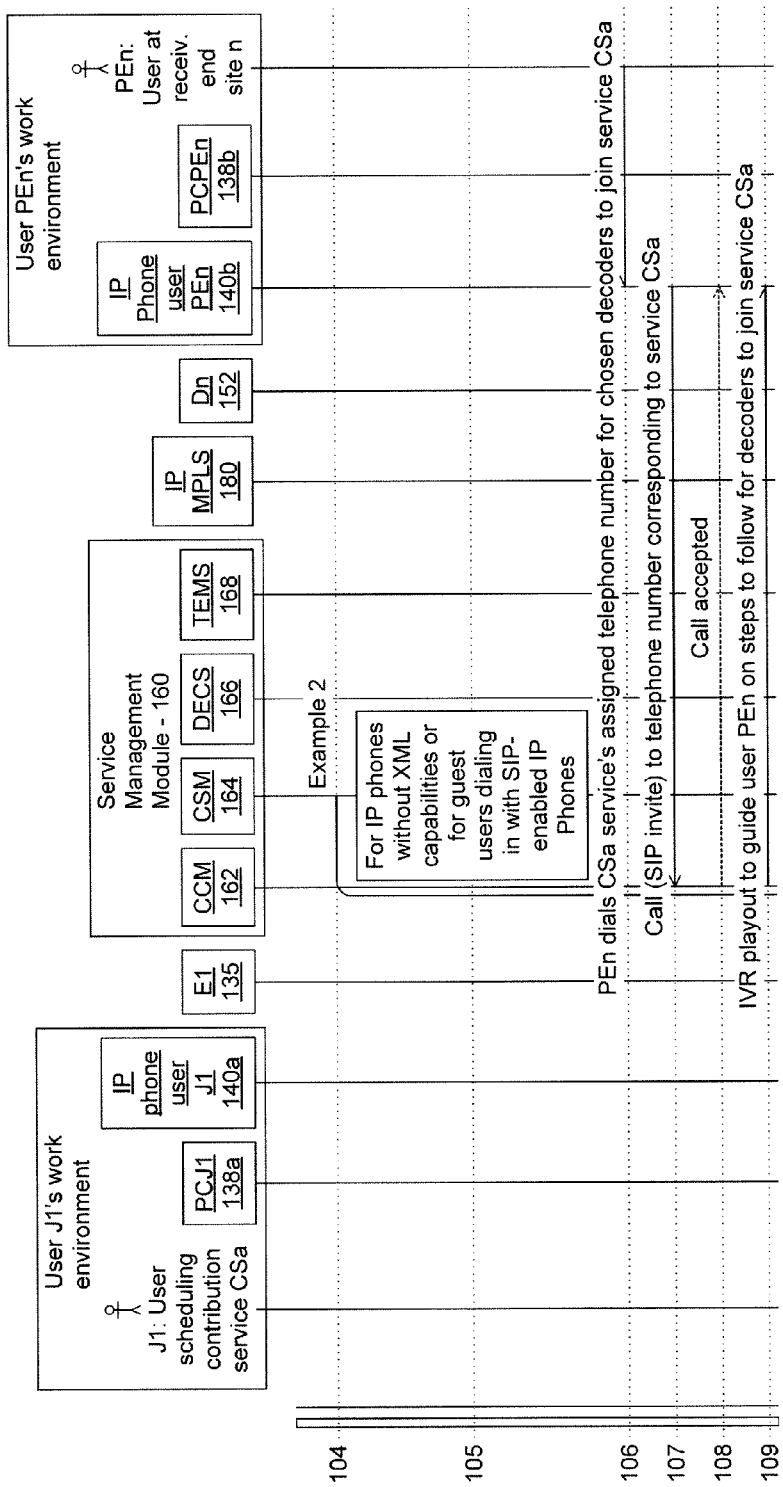
Figure 2T:
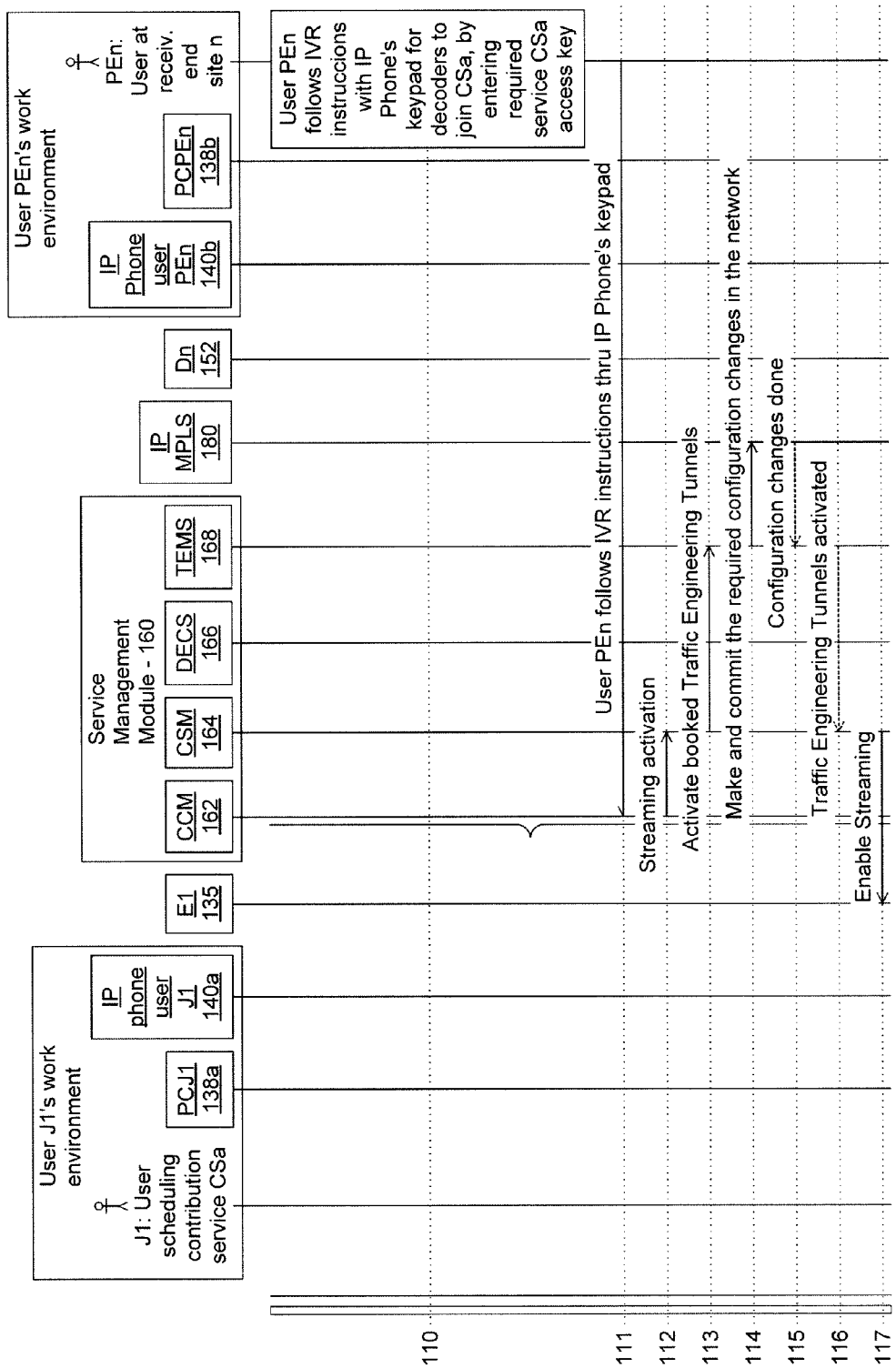
Figure 2U:
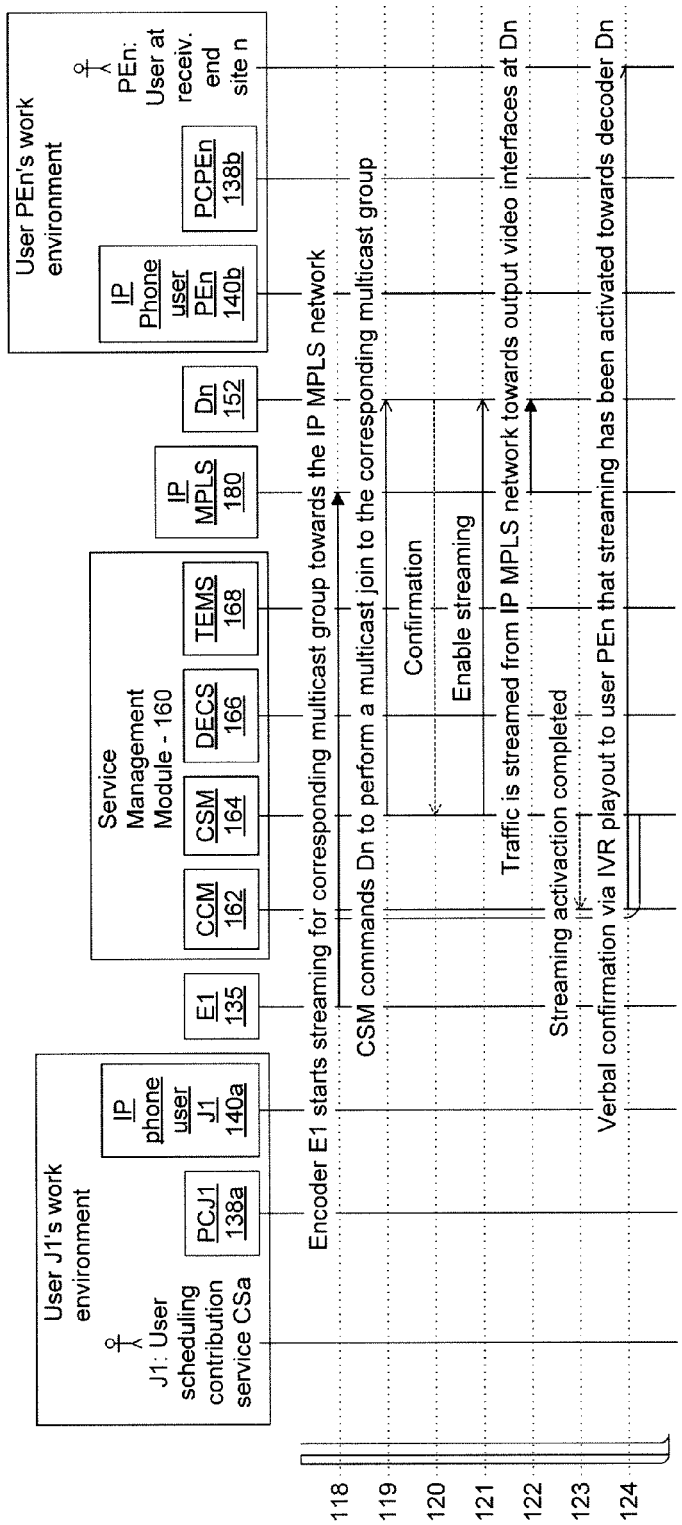

Reference is now made to the sequence diagram of FIGS. 2A-2U where processes including IP Phone registration, encoder and decoder registration, and scheduling and activation of a contribution service are depicted.

Device Registration Process

In FIGS. 2A-2U, IP phone 140*a* is registered manually (steps 1-2) by a user, e.g., a journalist J1, through the use of the IP phone keyboard, accessing a registration menu on the IP phone screen. As shown, registration (step 3) is performed towards CCM 162 and, as such, IP connectivity with CCM 162 is leveraged for this purpose. Of course, IP phones need to be registered in order to be usable in any system. At step 4, CCM 162 passes the registration request to DECS 166, which returns a message that the user J1 is authenticated and validated (steps 5-7). Once authenticated and validated, and if not already sent, appropriate application clients may be downloaded into the IP phone 140*a* for further user's use, such as a contribution service scheduling application client, for example, to allow any user to schedule contribution services by using, e.g., the IP phone's tactile screen.

Encoders and decoders may employ a registration key or password that is to be configured at the time of installation of the device. In accordance with an embodiment, encoders and decoders perform auto-registration whenever they are installed, powered up, and have IP connectivity to CSM 164. CSM 164 communicates with DECS 166 to fill the appropriate database. Steps 8-18 of FIGS. 2A-2U show a sequence related to encoder 135 and decoder 152 registration, authentication and validation. In an embodiment, each encoder may be designated by an identifier (e.g., a number or name).

Once all devices are properly registered, i.e., known to Service Management Module 160, it is possible to begin a schedulable contribution service setup process, beginning at step 19 in FIGS. 2A-2U.

Contribution Service Setup

In the following discussion, the acronym "$CS_a$" is used to represent a specific contribution service being scheduled.

The acronym "$PC_{J1}$" is used to represent a personal computer (PC) from which $J_1$ performs the scheduling of the contribution service $CS_a$.

The acronym "$E_1$" is used to represent encoder 135 at event site 130 that is being booked for the specific contribution service $CS_a$.

The acronyms "$PE_1$", "$PE_2$" and "$PE_3$" are used to represent users (e.g. Production Engineers, or others) of the system (i.e., user one, two and three, respectively) who are invited to join the specific contribution service $CS_a$.

The acronyms "$D_1$", "$D_2$" and "$D_3$" are used herein to represent the decoders 152 at the destination sites that will be used by invited production engineers $PE_1$, $PE_2$ and $PE_3$ respectively, to receive the media content corresponding to the specific contribution service $CS_a$.

Any of the users can schedule a contribution service $CS_a$ for a specific date and time using a calendaring application via a PC 138a, 138b, or using an IP Phone's 140a, 140b tactile screen in the corresponding scheduling application client that has previously been downloaded into the IP Phone.

As an example, and as shown, journalist $J_1$ starts to perform this scheduling with personal computer $PC_{J1}$. Looking at a calendar application client (connected online to DECS 166) (steps 21-22), it can be determined if origin encoder ($E_1$) to be used for $CS_a$ is currently logged in, and if for the date, time and duration of the event to be scheduled ($CS_a$) the origin encoder ($E_1$) to be used for $CS_a$ is available or, on the contrary, already booked (steps 23-27). If encoder $E_1$ is available, then $J_1$ configures the following example parameters for this contribution service schedule $CS_a$ as shown at step 28-29:

Name of the service (in our example, CSa) and brief description of the service (for example: NFL Football Match; Cowboys versus 49ers), Date and time at which $CS_a$ must start for the encoder selected at the origin site ($E_1$), Duration of $CS_a$, Encoding used and bandwidth required for the transmission, Multicast group corresponding to service $CS_a$, for receivers to join, Invitees list (e.g., list of identifiers) of those who are invited to join the contribution service $CS_a$; for example, $J_1$ can invite production engineer 1 ($PE_1$), production engineer 2 ($PE_2$) and production engineer 3 ($PE_3$). Guest access to the service $CS_a$ can also be configured, Event access key or password, optional (optionally, for security reasons, users joining $CS_a$ can be prompted for an access key or password), Email reminder that can be configured to be sent at a specific time before $CS_a$ starts (e.g. 15 min, 30 min, 1 day, etc.). This, in principle, could be configured to be sent daily, weekly, or bi-weekly before the service $CS_a$ starts, to all invitees, and Service recurrence, that can optionally be set in order to schedule a recurrent contribution service, daily, weekly, monthly, etc. at a specific time for a specific duration.

At step 30, $J_1$ causes the request to be saved to, e.g., her calendar client, in $PC_{J1}$. As such, the schedule/request is saved at DECS 166 (step 31). DECS 166 may optionally send (step 32) a "saved" acknowledgement back to $PC_{J1}$ and/or cause the calendar application to show the scheduled date and time as reserved.

The next step in the example sequence is the scheduling of contribution service $CS_a$ and the sending of invitations to participants, i.e., invitees as indicated by step 33.

At step 34, DECS 166 sends a notification of the $CS_a$ event to CSM 164. At step 35, CSM 164 schedules the service $CS_a$ for the specified date, time and duration, and reserves the required devices of which it is already aware of availability (encoder $E_1$ for now) (step 36). At steps 37-39 assignation of a telephone number to contribution service $CS_a$ occurs; at step 38, CSM asks CCM to assign a telephone number from a pool of dial numbers to be assigned to contribution services, then at step 39 CCM books and provides CSM with a telephone number, assigned from the dial numbers pool to be used by contribution services subject to be dialed in.

At steps 40-41 invitations are sent by CSM 164 to all invitees ($PE_1$, $PE_2$, and $PE_3$) via, e.g. email, arriving at the PC 138b of an invitee.

At steps 42-43, the invitees receive the invitations via email, and within the invitations, they are prompted to choose or designate a decoder 152 from a list of available decoders shown in their calendar application client (or downloaded or resident IP phone client application), for the specific date, time and duration of $CS_a$. Invitees accept the invitation after choosing the corresponding decoders from the list ($D_1$, $D_2$, and $D_3$ for $PE_1$, $PE_2$ and $PE_3$, respectively) (steps 44-49).

At steps 50-51 CSM 164 updates devices database at DECS 166 with the decoders chosen.

Now that an encoder and one or more decoders have been selected, step 52 begins a process of scheduling required network resources via TEMS 168. More specifically, once CSM 164 receives email confirmations of $CS_a$ accepted by receiving users $PE_1$, $PE_2$, and $PE_3$ and DECS 166 is appropriately updated, CSM 164 commands TEMS 168 (step 53) to check for availability of corresponding network bandwidth resources for a Traffic Engineering Tunnel that corresponds to contribution service $CS_a$. The function of checking by TEMS 168 is indicated at step 54 and a determination is made at steps 55-61. If bandwidth is available (on a shortest path, and if a shortest path is unavailable, on any convenient path), TEMS 168 books the tunnel accordingly. Since confirmations of accepted invitations from invitees will likely be received by CSM 164 in a sequential manner, CSM 164 may command TEMS 168 to add booking of leafs to the contribution service's multipoint TE tunnel as soon as invitations are received by CSM 164.

If TEMS 168 detects there are definitely not enough bandwidth resources end to end on none of the potential paths available for the service $CS_a$, TEMS 168 notifies (step 57) CSM 164 for CSM 164 to send warning messages (steps 58-59) via email to $J_1$ and invitees $PE_1$, $PE_2$ and $PE_3$, for $J_1$ to be able to re-schedule.

If TEMS 168 detects or determines that there are available network resources, then at step 62, those resources are booked in its scheduler.

Steps 63 and 64 represent a time period between the scheduling of contribution service $CS_a$ and a reminder time indicated by step 65.

At step 66, CSM 164 checks whether encoder E1 and decoders Dn are logged in, and then at steps 68-76 pushes reminders via email towards invitees at the reminder scheduled time, and, in an embodiment, text to the invitees IP phones' screens as well for IP phones with, e.g., XML support. If any of the involved devices (encoder, decoders) is not logged in, CSM 164 includes a corresponding warning of "device [ID name] not logged in", into the reminder email or into the text to be presented at the IP phone screen, optionally applying a color code in each reminder to signal the urgency to log in the encoders and decoders as soon as possible, e.g., blinking red for the last reminder, 15 minutes before $CS_a$ date and time.

Now referring to steps 77-78, at the exact date and time of $CS_a$, CSM 164 checks, for one last time, the status flag of the devices expected to be logged in, and if origin encoder ($E_1$) and any of the receiving decoders ($D_1$, $D_2$, $D_3$) is logged in, authenticated and validated, and not in use already, it starts service $CS_a$, described below. However, if, e.g., encoder ($E_1$) is not logged in, then at steps 81-82 an abort notification is sent by CSM 164 to both $J_1$ and $PE_n$ via email. Also, a service abort notification is sent at step 83 to CCM 162, which, in turn, causes, at steps 84-85 interactive voice recording (IVR) playout on an automated voice mail and/or text messages to be sent to the IP phones of $J_1$ and $PE_n$.

If devices are logged in (step 86-87), at this point two alternative example embodiments are shown. Example 1 at steps 88-103 shows the case of IP phones with XML capabilities where no dial-in to a telephone number is required in order to join a contribution service but a single button dial is possible instead, whereas example 2 at steps 104-124 shows the case of IP phones without XML capabilities or guest users in which case they can command decoders to join a contribution service by dialing the assigned number and by following instructions given thru an IVR dialog. For Example 1 starting at step 89, CSM commands (step 90) TEMS 168 to activate the previously booked TE tunnel, by making and committing the required configuration changes in the network elements along the path that are subject to be provisioned for this service (e.g., customer premises equipment and provider edges), as shown by steps 91-93.

Once the traffic tunnels are confirmed enabled, CSM 164 enables, at step 94, streaming in the origin encoder ($E_1$). At step 95, Encoder $E_1$ starts streaming for corresponding multicast group towards the IP MPLS network 180.

Then, at step 96, CSM 164 pushes specific content to the receiving users' IP phones, to enable one-touch access to the service $CS_a$, in order to allow invitees to use a single button in their IP phones to join the service. Invitees receive on their IP phone screens notification that service $CS_a$ has started and is available to be joined by pushing a single button (step 97).

At the time invitees push the single button on their IP phones in order to join the service (step 98), an IVR welcome message may be played over the invitees IP phones. Then, at step 99, the IP phones send confirmation of this event (invitee joining service) towards CSM 164.

In response, CSM 164 commands (steps 100-101) the corresponding decoders ($D_1$, $D_2$, $D_3$) to perform a multicast join to the scheduled multicast group.

Finally, at steps 102-103, CSM 164 enables streaming in the receiving decoders $D_1$, $D_2$ and $D_3$, and traffic is streamed from IP MPLS 180 towards output video interfaces, i.e., the appropriate decoders.

Example 2 starting at step 104 shows the option of IP phones without XML-type capabilities being used by the users for commanding decoders to join a contribution service by dialing in a telephone number previously assigned by the CCM 162 from a pool of telephone numbers dedicated for this purpose, as shown in steps 37-39, and being provided to users by having included the number in the email invitation to the contribution service $CS_a$ shown at step 41. In the example described, but not limited to, IP phones can be SIP-enabled, but since the process of dialing in is an IVR-driven process, any phone that is capable of doing tone dialing may be used.

The process of Example 2 is as follows. At step 106, user $PE_n$ dials $CS_a$ assigned telephone number to command decoders to join the service $CS_a$. Then at steps 107-108 IP phone of user $PE_n$ 140b calls with a Session Initiation Protocol (SIP) invite towards CCM 162 and CCM 162 accepts the call. At step 109, an IVR playout process is started by CCM 162 in order to guide $PE_n$ on the steps to be followed for corresponding decoders to be able to join the service $CS_a$. Then at steps 110-111 user $PE_n$ follow the IVR instructions by using the IP phone's keypad and enters the service $CS_a$'s access key.

At step 112 CCM 162 commands CSM 164 to activate streaming so at step 113 CSM 164 commands TEMS 168 to activate the previously booked traffic engineering tunnels both at origin end and at the leaf corresponding to this first receiving end that has dialed in, then at steps 114-116 CSM 164 makes and commits the required configuration changes in the IP MPLS network 180.

At steps 117-118, CSM 164 commands Encoder E1 135 to enable streaming at the origin, then E1 135 starts streaming for the corresponding multicast group towards IP MPLS 180.

At this point, at steps 119-121 CSM 164 commands decoder Dn 152 to perform a multicast join to the corresponding multicast group, and requests Decoder Dn 152 to enable streaming so that the streaming traffic is delivered to the decoder Dn 152 video interface towards the production environment.

The process is finished at steps 123-124, where CSM 164 notifies CCM 162 that the streaming activation process have been completed, then CCM 162 completes the IVR playout process towards user PEn with a verbal notification that streaming has been activated towards Decoder Dn 152 and the service activation is completed for this decoder.

Subsequent users at receiving ends joining the contribution service CSa dialing in through this process are provisioned in the same way described in Example 2, steps 104-124, with the only consideration that given the traffic engineering tunnel for a multipoint transport is a point to multipoint tunnel, the tunnel portion at the headend side has already been provisioned during the activation of the first user joining, and the streaming at the encoder E1 135 end has already been commanded to activate streaming during the same process, so there is no need to reconfigure that part of the service.

Alternative embodiments are also contemplated including:

1) Giving users the option of browsing a list of scheduled contribution services for a specific period of time by using their IP phone devices' screen and buttons, then auto-inviting to one or several of these services if the guest option has been activated at the time of scheduling the service.

2) Creating immediate contribution services (either point to point or multipoint) with the IP phone devices' user interface (screen, buttons) at the same time that users may be talking on the phone, where the contribution service originator selects a specific encoder from a list or directory of available devices accessible and browsed via the IP phone user interface, giving the remote ends that are participating in, e.g., a conference call the ability to select a remote decoder from the list of available devices that is accessible and browsed via the IP phone user interface, then instruct a join to the service by a one-touch access or single button.

3) Providing IP phones with a scheduling function so that users, without a personal computer on hand, at any given time can use their IP phones to schedule a contribution service via the IP phone's user interface (tactile screen and buttons).

Embodiments described herein enable users of contribution services to provision their own broadcast media contribution services at any given time, decide who can be invited to join a specific contribution service, and leverage network resources in a more efficient way. In sum, embodiments described herein provide a system with increased flexibility in the way contribution services are scheduled, provisioned, and joined to.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method comprising:
   receiving, at a service management module having a processor and associated memory, a request to schedule an audiovisual data streaming session, the request including an identifier of an encoder, a session time and an identifier of an invitee associated with the audiovisual data streaming session;
   generating a command configured to cause the encoder to begin encoding audiovisual content at the session time, and to stream encoded audiovisual content via the network;
   receiving an indication that the invitee has joined the audiovisual data streaming session;
   generating a command configured to cause a decoder designated by the invitee, from among a plurality of available decoders, to begin decoding the encoded audiovisual content upon receipt of the encoded audiovisual content; and
   receiving an authentication request from the decoder and adding the identifier of the decoder to a list of available decoders from which the identifier of the decoder can be selected.

2. The method of claim 1, further comprising receiving an identifier of the decoder prior to receiving the indication that the invitee has joined the audiovisual data streaming session.

3. The method of claim 1, further comprising confirming that the encoder and the decoder are logged into the network and available for use prior to the session time.

4. The method of claim 1, further comprising receiving an authentication request from the encoder and adding the identifier of the encoder to a list of available encoders from which the identifier of the encoder can be selected for the request to schedule the audiovisual data streaming session.

5. The method of claim 1, further comprising generating a command configured to cause data traffic tunnels, which are configured to enable communication between the encoder and the decoder, to be reserved for the audiovisual data streaming session.

6. The method of claim 1, further comprising sending an electronic reminder regarding the audiovisual data streaming session to the invitee a predetermined amount of time prior to the session time of the audiovisual data streaming session.

7. The method of claim 6, further comprising sending the electronic reminder to an Internet Protocol (IP) telephone.

8. The method of claim 1, further comprising sending a command to an Internet Protocol (IP) telephone, wherein the command is configured to enable the IP telephone to return a command to join the audiovisual data streaming session.

9. The method of claim 1, further comprising generating a command to cause an interactive voice notification to be played out over an audio generating device in response to a command to abort the audiovisual data streaming session.

10. A processor readable medium encoded with instructions that, when executed by a processor, cause the processor to:
    send a notification to an invitee of an audiovisual service in response to a request to schedule the audiovisual service, wherein the request to schedule the audiovisual service includes, at least, a start time and an identifier of an encoder;
    receive a response from the invitee including an identifier of a decoder, from among a plurality of available decoders, configured to decode encoded audiovisual data;
    generate a command to cause network resources in a network to be reserved, using the start time, to support the audiovisual service between the encoder and the decoder; and
    receive an authentication request from the decoder and add the identifier of the decoder to a list of available decoders from which the identifier of the decoder can be selected.

11. The processor readable medium of claim 10, further comprising instructions that, when executed by the processor, cause the processor to:
    send a notification to the invitee to join the audiovisual service;
    receive a response from the invitee to join the audiovisual service;
    generate a command configured to cause the encoder to begin generating the encoded audiovisual data; and
    generate a command configured to cause the decoder to begin decoding the audiovisual data.

12. The processor readable medium of claim 10, further comprising instructions that, when executed by the processor, cause the processor to:
    confirm that the audiovisual encoder and the audiovisual decoder are logged into a network and available for use at the start time.

13. The processor readable medium of claim 10, further comprising instructions that, when executed by the processor, cause the processor to:
    generate a notification indicating that the encoder is not logged into the network.

14. The processor readable medium of claim 10, further comprising instructions that, when executed by the processor, cause the processor to:
    generate a command to cause an interactive voice recording abort message to play in response to a command to abort the audiovisual service.

15. The processor readable medium of claim 10, further comprising instructions that, when executed by the processor, cause the processor to:
    generate a notification indicating that the decoder is not logged into the network.

16. An apparatus, comprising:
    a network interface; and
    a processor that is configured to:
      receive a request to schedule an audiovisual data streaming session, the request including an identifier of an encoder, a session time and an identifier of an invitee associated with the audiovisual data streaming session;

generate a command configured to cause the encoder to begin encoding audiovisual content at the session time, and to stream encoded audiovisual content via the network;

receive an indication that the invitee has joined the audiovisual data streaming session;

generate a command configured to cause a decoder designated by the invitee, from among a plurality of available decoders, to begin decoding the encoded audiovisual content upon receipt of the encoded audiovisual content; and receive an identifier of the decoder prior to receiving the indication that the invitee has joined the audio visual data streaming session.

17. The apparatus of claim 16, wherein the processor is further configured to:

generate a command configured to cause data traffic tunnels, which are configured to enable communication between the encoder and the decoder, to be reserved for the audiovisual data streaming session.

18. The apparatus of claim 16, wherein the processor is further configured to:

generate a command to cause an electronic reminder regarding the audiovisual data streaming session to the invitee a predetermined amount of time prior to the session time of the audiovisual data streaming session.

* * * * *